United States Patent [19]
Aoshima

[11] Patent Number: 5,862,207
[45] Date of Patent: Jan. 19, 1999

[54] METHOD AND SYSTEM FOR PROVIDING VIRTUAL TELEPHONE TERMINALS

[75] Inventor: Akihiko Aoshima, Hino, Japan

[73] Assignee: Toshiba Corporation, Kawasaki, Japan

[21] Appl. No.: 610,734

[22] Filed: Mar. 5, 1996

[30]   Foreign Application Priority Data

Mar. 6, 1995  [JP]  Japan .................................... 7-045268

[51] Int. Cl.$^6$ .................................................. H04M 3/42
[52] U.S. Cl. ........................... 379/201; 379/211; 379/355
[58] Field of Search .................................... 379/201, 210, 379/211, 212, 355, 216

[56]       References Cited

U.S. PATENT DOCUMENTS

| | | | |
|---|---|---|---|
| 4,759,056 | 7/1988 | Akiyama .................................. | 379/197 |
| 4,899,373 | 2/1990 | Lee et al. ................................. | 379/201 |
| 5,197,096 | 3/1993 | Sakuma et al. ......................... | 379/211 |
| 5,392,340 | 2/1995 | Otsuka .................................... | 379/201 |
| 5,572,584 | 11/1996 | Yabusaki et al. ....................... | 379/211 |

*Primary Examiner*—Ahmad F. Matar
*Attorney, Agent, or Firm*—Finnegan, Henderson, Farabow, Garrett & Dunner, L.L.P.

[57]       ABSTRACT

A system for permitting a user having a personal directory number (PDN) to use a virtual terminal identified by the PND from any of said telephone terminals that the PDN is linked with. If a request for a virtual terminal assignment and the ID of a user are received from one of the terminals, a PDN linked with the ID in personalized feature data is associated with the TDN of the terminal. Thereafter, if a virtual terminal for the PDN linked with the TDN of the terminal is requested from the terminal, the terminal is associated with personalized feature data identified by the PDN and key data associated with the PDN and the TDN to make the terminal in a personal mode of the PDN. In response to a reception of call processing data from the terminal, a call processing is performed on the basis of the personalized feature data, the key data, and terminal data identified by the TDN for specifying a type of the terminal. If a call is originated by dialing the PDN of a called party while the called party's presence is registered for a nearby terminal, the call is connected to the nearby terminal. The invention is applicable to a PBX system through a nation wide public switched telephone network.

21 Claims, 27 Drawing Sheets

FIG.6A

| TDN | NATIVE VT | TEMP TERM MODE | Pi MODE POINTER i | PERSONAL(Pi) MODE | | | | |
|---|---|---|---|---|---|---|---|---|
| | | | | P1 | P2 | P3 | P4 | P5 |
| 5000 | — | — | 0 | 2000 | 2001 | 2003 | EOF | |
| 5001 | 2000 | — | 0 | 2002 | EOF | | | |
| 5002 | 2012 | — | 3 | 2001 | 2003 | 2013 | EOF | |
| 5000+(N-1) | — | — | 0 | EOF | | | | |

| PDN | NAME | ID OR PASSWARD | SERVICE FLAG | TIME OUT (sec.) | PERIOD OF TEMPORARY TERMINAL MODE | SUB- SCRIBER PDN ※ | ... | KEY ASGMT TO Ti | | |
|---|---|---|---|---|---|---|---|---|---|---|
| 2000 | SECTARY | | 07H | | | — | | T1 | ... | ... |
| 2001 | C.Louis | | | | | — | | T2 | T3 | ... |
| 2002 | PRESIDENT | ×××× | 07H | 10 | | — | | T1 | T3 | ... |
| 2003 | J.Bush | | | | | | | . | . | ... |
| 2004 | | | | | | — | | | | |
| 2000+(P-1) | B.White | | | | | — | | T2 | T1 | T5 ... |

830

※ THIS FIELD IS UNNECESSARY IN CASE OF PBX

FIG.7C

| BIT | | CONTENTS |
|---|---|---|
| b2b1b0= | 0 | INTRA PBX |
| | 1 | OUTSIDE CALL VIA ATTENDENT OPERATOR |
| | 2 | DIRECT OUTWARD DAIALING TO SELF NPA CODES AREA |
| | 3 | DIRECT OUTWARD DAIALING TO SPECIFIED NPA CODES AREA |
| | 4 | DIRECT OUTWARD DAIALING TO SPECIFIED ALL CODES AREA |
| b3 | | TEMP TERM MODE |
| b4 | AVAILABLE SERVICE | $SV_k$ |
| b5 | | $SV_{k+1}$ |
| b6 | | $SV_{k+2}$ |
| b7 ⋮ | | ⋮ |

DATA STRUCTURE IN CASE OF PBX

FIG.8A

| TRMNL TYPE | ATTRIB. FLAGS | AVAILABLE SERVICE (0 = NO, 1 = YES) | | | ... | | | | |
|---|---|---|---|---|---|---|---|---|---|
| | | SV1 | SV2 | SV3 | ... | SVk | SVk+1 | SVk+2 | ... |
| T1 | 2000H | 1 | 1 | 0 | | 1 | 0 | 0 | ... |
| T2 | 0 | 1 | 0 | 1 | | 0 | 0 | 0 | ... |
| T3 | 2420H | 1 | 1 | 1 | | 1 | 0 | 0 | ... |
| T4 | 2420H | 1 | 1 | 1 | | 1 | 1 | 0 | ... |
| T5 | 2641H | 1 | 1 | 1 | | 1 | 1 | 1 | ... |
| T6 | . | . | . | . | | . | . | . | . |
| ... | | | | | | | | | |
| Ti | | . | . | . | | . | . | . | . |
| Ti+1 | | . | . | . | | . | . | . | . |
| Ti+2 | | . | . | . | | . | . | . | . |
| Ti+3 | | . | . | . | | . | . | . | . |
| Ti+4 | | . | . | . | | . | . | . | . |
| Ti+5 | | . | . | . | | . | . | . | . |

The rightmost columns (SVk, SVk+1, SVk+2, ...) correspond to ANALOG PHONE SUPPLEMENTARY SERVICE.

TERMINAL TYPE DETERMINANTS:

| LINE ATTRIB. | MOBIL TELEPHONE | | FIXED TELEPHONE | | | | |
|---|---|---|---|---|---|---|---|
| | DIGITAL | ANALOG | DIGITAL | | | ANALOG | |
| | MD1 | MA1 | FD1 | ... | FDj | FA1 | FA2 |

FIG.8B

| BIT | CONTENTS | | IN CASE OF T1 | IN CASE OF T5 |
|---|---|---|---|---|
| 0 | CALL-E-INFO/KEY DATA (DIGITAL) | | 0 | 1 |
| 1~7 | DISPLAY | DIGITS | 0 | 20H |
| 8~12 | | LINES | 0 | 6H |
| 13 | LOUDSPEAKER | | 1 | 1 |
| 14 | MAGNETIC CARD READER | | 0 | 0 |
| 15 | . | | . | . |
| 16 | . | | . | . |
| ⋮ | ⋮ | | . | . |

830

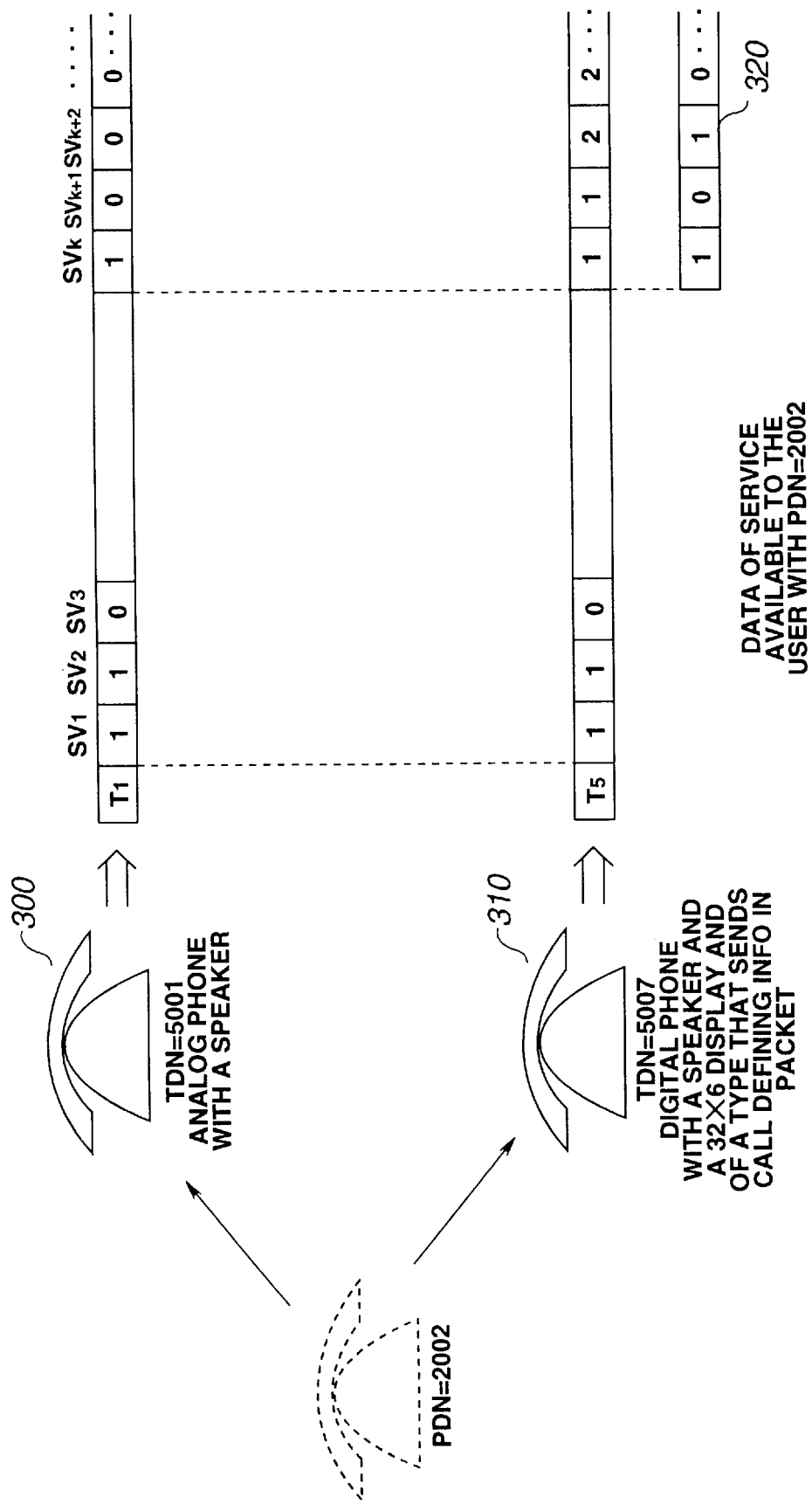

FIG.10

| TERMINAL TYPE | 1 | 2 | 3 | 4 | 5 | 6 | 7 | 8 | 9 | 10 | 11 | 12 |
|---|---|---|---|---|---|---|---|---|---|---|---|---|
| | DK FOR FC1 | DK FOR FC2 | DK FOR FC3 | DK FOR FC4 | DK FOR FC5 | DK FOR FC6 | DK FOR FC7 | DK FOR FC8 | DK FOR FC9 | DK FOR FC10 | DK FOR FC11 | DK FOR FC12 |
| T1 | * | # | MODE | PDN | TDN | ASSGN | | | | | | |
| T2 | | | | | | | | | | | | |
| T3 | | | | | | | | | | | | |

840

| | i | i+1 | i+2 | i+3 | i+4 | i+5 |
|---|---|---|---|---|---|---|
| | DK FOR FCi | DK FOR FCi+1 | DK FOR FCi+2 | DK FOR FCi+3 | DK FOR FCi+4 | DK FOR FCi+5 |

| | i+9 | i+10 | i+11 | i+12 | i+13 | i+14 | i+15 | i+16 | i+17 | i+18 | i+19 | i+29 |
|---|---|---|---|---|---|---|---|---|---|---|---|---|
| | DK FOR FCi+9 | DFC FOR AK1 | DFC FOR AK2 | DFC FOR AK3 | DFC FOR AK4 | DFC FOR AK5 | DFC FOR AK6 | DFC FOR AK7 | DFC FOR AK8 | DFC FOR AK9 | DFC FOR AK10 | DFC FOR AK20 |
| | | FCi+2 | FCi+3 | FCi+4 | FCi+5 | FCi | FC12 | | | | FC7 | |

FC: FUNCTION CODE
DK: DEFAULT KEY
DFC: DEFAULT FUNCTION CODE

FIG.11

| FUNCTION CODE NAME | FUNCTION |
|---|---|
| $FC_1$ | * |
| $FC_2$ | # |
| $FC_3$ | CHANGE MODE (MODE) |
| $FC_4$ | CAUSE THE TERMINAL TO ENTER PERSONAL MODE OF PERSONAL TELEPHONE DIRECTORY NUMBER INPUT SUBSEQUENTLY TO THE CODE (PDN) |
| $FC_5$ | MAKE THE TERMINAL RETURN TO STANDARD OR NATIVE MODE (TDN) |
| $FC_6$ | ASSIGN PDN TO A TERMINAL (ASSGN) |
| $FC_7$ | RESISTER THE PRESENCE (PRSNT) |
| $FC_8$ | CALL WITH THE LOUDSPEAKER (SPKR) |
| $FC_9$ | DISABLE THE MICROPHONE DIRING HANDS FREE CALLING (MUTE) |
| $FC_{10}$ | RELEASE PRIVACY BETWEEN SPECIFIC TELEPHONE SETS (CONF) |
| $FC_{11}$ | HOLD THE SELECTED OFFICE LINE TEMPORARITY (HOLD) |
| $FC_{12}$ | DISCONNECT THE LINE FOR A PREDETERMINED SHORT PERIOD OF TIME (FLASH) |
| $FC_i, FC_{i+1}$ | SELECTING AN EXTENSION LINE (INT 1, INT 2) |
| $FC_{i+2}, FC_{i+9}$ | SELECTING AN OFFICE LINE (C01 THROUGH C08) |

FIG.12

| KEY ASGN CODE | FUNCTION CODE NAME FOR FUNCTION PBX 100 PERFORMS TO RECEIPT OF FCi | | | | | | | | | |
|---|---|---|---|---|---|---|---|---|---|---|
| | 1 | 2 | 3 | 4 | 5 | 6 | 7 | 8 | 9 | 10 |
| 2000T2 | | | | | | | | | | |
| 2000T4 | | | | | | | | | | |
| ..... | | | | | | | | | | |
| 2000T1 | | — | FC8 | FC9 | FC10 | FC11 | — | | | |
| 2000T3 2000T4 | | | | | | | | | | |
| ..... | | | | | | | | | | |

850

| | | | | | | | | FUNCTION KEY FOR AK1 THROUGH AK20 | | | | | | | | | | | | AK20 |
|---|---|---|---|---|---|---|---|---|---|---|---|---|---|---|---|---|---|---|---|---|
| | | | | | | | | | | | | | | AK8 | AK9 | AK10 | | | | |
| i | i+1 | i+2 | i+3 | i+4 | i+5 | i+9 | i+10 | i+11 | i+12 | i+13 | i+14 | i+15 | i+16 | i+17 | i+18 | i+19 | | | | i+29 |
| — | — | — | — | | | — | | | | | | FC3 | FC4 | FC5 | FC6 | | | | | — |

FIG.13
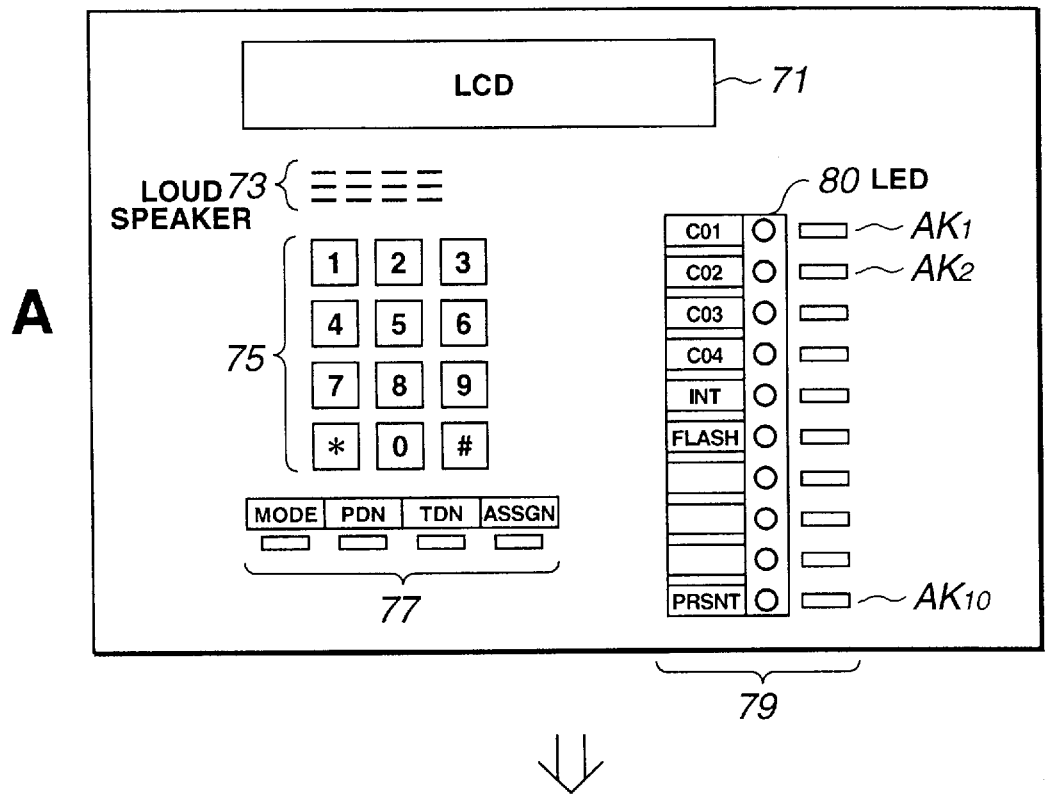
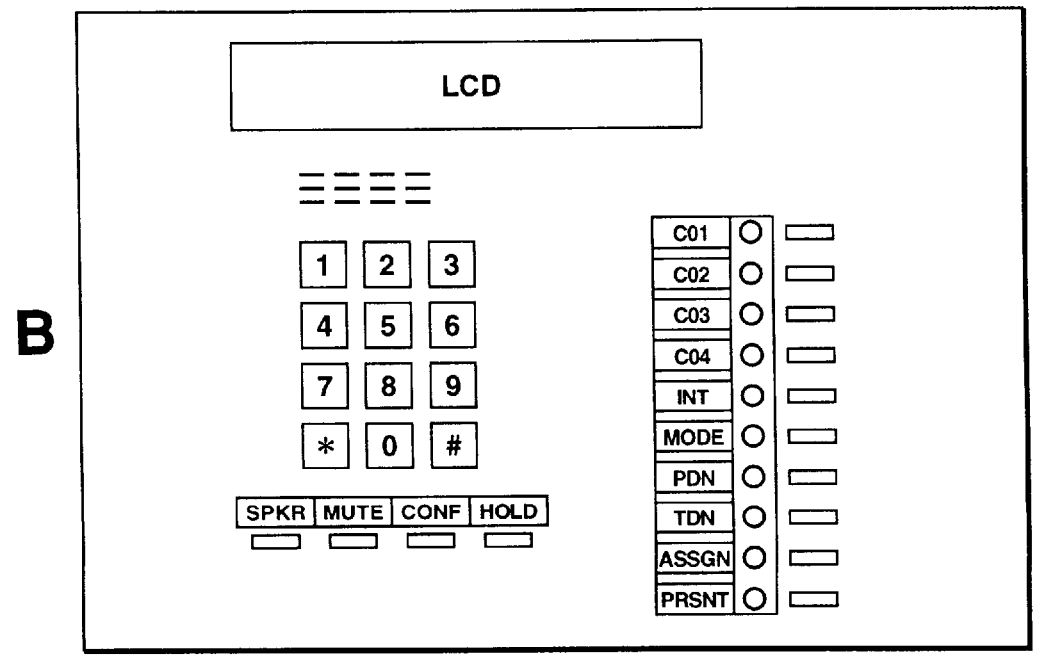

ASSIGN VIRTUAL TERMINAL TO A REAL TERMINAL

FIG.16
A. DIALED TDN IN STANDARD MODE
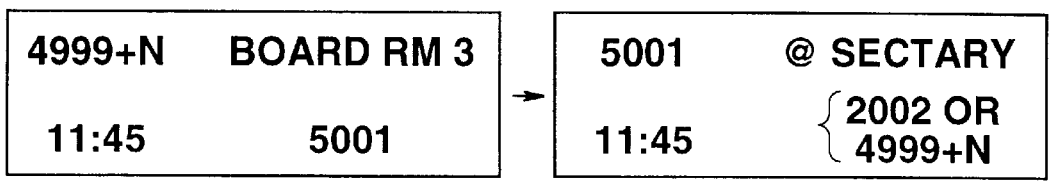
B. DIALED TDN IN PERSONAL MODE
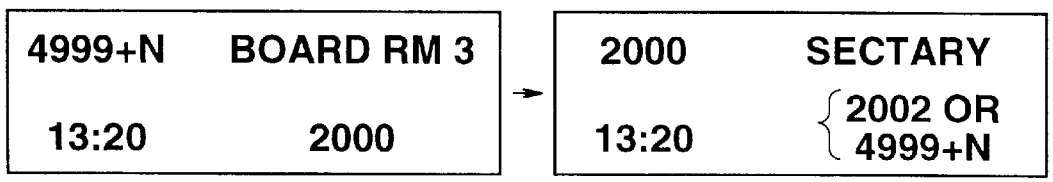
C. DIALED PDN
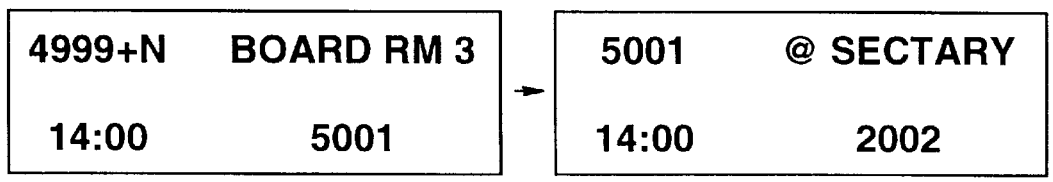
PERSONAL MODE
AUTOMATICALLY
DISPLAY ON
CALLING TERMINAL
DISPLAY ON
CALLED TERMINAL

FIG.23

| BIT | SERVICE |
|---|---|
| 0 | CALL TRANSFER (SKk) |
| 1 | CALL FOWARDING BUSY (SKk+1) |
| 2 | CHARGE INFO. TRANSFER (SKk+2) |
| 3 | INHIBITING RINGING (SKk+3) |
| 4 | CALL WAITING (SKk+4) |
| 5 | CONFERENCE CALLING (SKk+5) |
| 6 | TEMPORARY TERMINAL MODE (SKk+6) |
| 7 | CALLER NUMBER IDENTIFICATION (SKk+7) |
| ⋮ | ⋮ |

DATA STRUCTURE IN CASE OF
PUBLIC EXCHANGE NETWORK

METHOD AND SYSTEM FOR PROVIDING VIRTUAL TELEPHONE TERMINALS

BACKGROUND OF THE INVENTION

1. Field of the Invention

The invention relates to a telecommunication switching system, more particularly to a telephone system and method for permitting a user to use any telephone terminal in the same operational environment as his or her own telephone terminal by means of a virtual telephone terminal assigned to the user.

2. Description of the Prior Art

A variety of telephone features has become available with advances in exchange facilities and telephone terminals. An integrated service digital network (ISDN) provides, for example, calling number indication, call transfer, voice mail services, a private branch exchange (PBX) enables trunk calling limited by a class of service, various kinds of call transfers, speed dialing and function assignment to keys, etc. Most of these features are achieved by using personalized data stored in a feature data storage location associated with the user's home base telephone in the telephone exchange to which the user's home base telephone is connected. According, there is a problem in the prior art that the personalized features are available only from the user' home base telephone.

Arrangements have been devised so far to cope with the problem. One such arrangement is disclosed by Tadahiro Akiyama in U.S. Pat. No. 4,759,056 (1988). Also, Chinmei C. Lee et al. describes in U.S. Pat. No. 4,899,373 an arrangement for making personalized telephone features available to users away from their home base by storing data associated with their ID in a nationally accessible data base system.

However, in such arrangements, a service required by a user may not be supported for the type of the telephone terminal being used by the user. Since neither Akiyama nor Lee et al. have taken telephone terminal types into account in the above cited arrangements, the above problem will rise when the arrangements are applied to a public switched telephone network or a PBX to which various types of telephone terminals are connected.

Another problem with the prior art is that a call is not necessarily connected to the telephone terminal at the location where there is a person to whom the caller desires to talk because the call is placed by specifying as a destination the terminal number or directory number of a telephone terminal at a location where the caller expects the person to be.

SUMMARY OF THE INVENTION

The above and other problems of the prior art are solved an(d a technical advance is achieved in accordance with the principles or the present invention which, in one aspect, is a system for permitting users to use their own virtual terminals with numbers assigned to the users through arbitrary telephone terminals. The invention is applicable to a PBX system, a local exchange system, an exchange network comprising a plurality of local exchanges, and a nation wide public switched telephone network, etc.

A system according to one aspect of the invention is provided with a data base which is accessible from any of the telephone terminals in the system and at least comprises data associated with a directory number of each telephone terminal or a terminal directory number (TDN) (the data being referred to as "TDN related tables or data", which further comprise a mode table and a terminal table) and data associated with a directory number assigned to each of the users or a personal directory number (PDN) of each user (the data being referred to as "PDN related tables or data", which further comprise a virtual terminal table and a personal data table). At least one TDN related table and at least one PDN related table each include a field group which serves each other as an inverted file. On the basis of the data base, each of the users is provided with personalized features permitted to or subscribed by the user in response to the attributes of the telephone terminal being used by the user and the attributes of the line to which the telephone terminal is connected.

Specifically, if a personal directory number PDN is received from one of the telephone terminals, a virtual terminal service is provided to the telephone terminal which sent the PDN on the basis of personalized terminal data associated with the telephone terminal and personalized feature data associated with the PDN. When a telephone terminal is in such a state, it is said that the terminal is in a "personal mode". The state of a terminal which is not receiving a virtual terminal service is called a "standard mode". While the terminal is in the personal mode for the PDN, the user of the PDN can use personalized telephone features in an assignment of functions to keys which the user has set from the terminal as if it were his or her own terminal, even if the terminal is away from his or her home base. That is, in response to a request for a call service, an appropriate service is provided in reference to data on telephone features subscribed by or limited to the user and data of a terminal attribute table.

A user can assign the user's PDN to any telephone terminals the user wants, usually ones the user often uses or the one the user is going to use for a certain period of time or more. Once the PDN has been assigned to a specific telephone, the user can select his or her PDN from the PDNs which have been assigned to the specific telephone through a simple operation. In response to the selection of PDN, a virtual terminal service associated with the PDN come to be provided for the telephone from which the selection has been made, that is, the telephone terminal becomes in a personal mode of the PDN. The above described assignment of a user's PDN to a telephone terminal involves a specification of the priority order of the telephone terminal in assignment (ASGMT) fields as described later.

If the user places a call by dialing a destination TDN as is usually practiced, the call is connected to the telephone with the TDN. The user can also place a call by dialing a PDN of a person to whom the user desires to talk or a called party. In this case, the call is connected to the terminal which is among the idle ones of the terminals to which the PDN have been assigned and which has the highest priority of termination among the idle terminals. Also, the user can execute a predetermined operation at any terminal near the user to register the user's presence for the terminal, that is, to enter data indicative of the user's presence in association with the TDN of the terminal. If the called party has registered his or her presence for a telephone terminal, a call originated by dialing the PDN of the called party is connected to the telephone terminal regardless of whether the called party has assigned his or her PDN to the telephone terminal.

If the present invention is embodied in a PBX system, the above mentioned data base is realized on a memory connected to a controller of the PBX. On the other hand, if the invention is embodied in a public switched telephone network (PSTN): the data base is so constructed as to enable all of the exchanges constituting the PSTN to access the data base by means of common channel signaling; if an exchange receives a PDN from a telephone terminal, the exchange which received the PDN causes the data base to be searched, retrieves data associated with the PDN and/or the TDN of the terminal which sent the PDN from the data base, and stores the retrieved data temporarily at a location associated with the terminal in a memory of the exchange. The subsequent operations are the same as in case of a PBX system.

BRIEF DESCRIPTION OF THE DRAWINGS

Further objects and advantages of the present invention will be apparent from the following description of the preferred embodiments of the invention as illustrated in the accompanying drawings. In the drawings:

FIGS. 6A and 6B show a mode table and a terminal table respectively, each record of which has a key field containing a TDN of each of the telephones served by the exchange shown in FIG. 1;

FIGS. 7A and 7B show a virtual terminal table and a personal data table respectively, each record of which has a key field containing a PDN of each of the users, the virtual terminal table further comprising fields of TDNs of the real terminals to which the PDN has been assigned, and the personal data table further comprising fields of personalized data on telephone features;

FIG. 7C shows exemplary contents of the service flags shown in FIG. 7B for use in case when the invention is applied to a PBX system;

FIG. 8A is a terminal attribute table showing basic and supplementary services supported for the terminals of the terminal types determined by line attributes and terminal attributes in the embodiment as shown in FIG. 1;

FIG. 8B shows exemplary contents of the flags shown in FIG. 8A;

FIG. 9 illustrates telephone environments provided by the terminals whose TDNs=xxxx-5001 and xxxx-5007 and which the user with a PDN=xxxx-2002 has assigned his or her PDN to;

FIG. 10 is a standard (default) key table which comprises standard key assignment data for each terminal type;

FIG. 11 is a table showing an action of PBX 100 for each function code of CFi wherein a function code which is sent from a telephone terminal to the PBX 100 when one of the keys is pressed at the terminal is labeled with a function code name CFi;

FIG. 12 shows an exemplary arrangement for a personalized key table each record of which comprises personalized key data for the terminal type code, of the terminal the user desires to customize, which is contained in personalized key fields of the personal data table;

FIG. 13 shows key configurations in case (A) when default data are set as PDN dependent data to a terminal of the terminal code T1 (that is, the terminal is in a standard mode) and in case (B) when the terminal is made in the personal mode specified by a PDN with which PDN dependent data are associated in the personal data table of FIG. 7B;

FIG. 16 is a diagram showing displays on LCDs of a calling and a called party in a call under various modes;

FIG. 23 is a table showing exemplary service flags in the personal data table in the embodiment of FIG. 22.

DETAILED DESCRIPTION OF THE PREFERRED EMBODIMENTS

Embodiment I

For the purpose of simplicity or explanation, a first illustrative embodiment will be described in connection with a private branch exchange (PBX) system.

Hardware Arrangement

Figure 1:
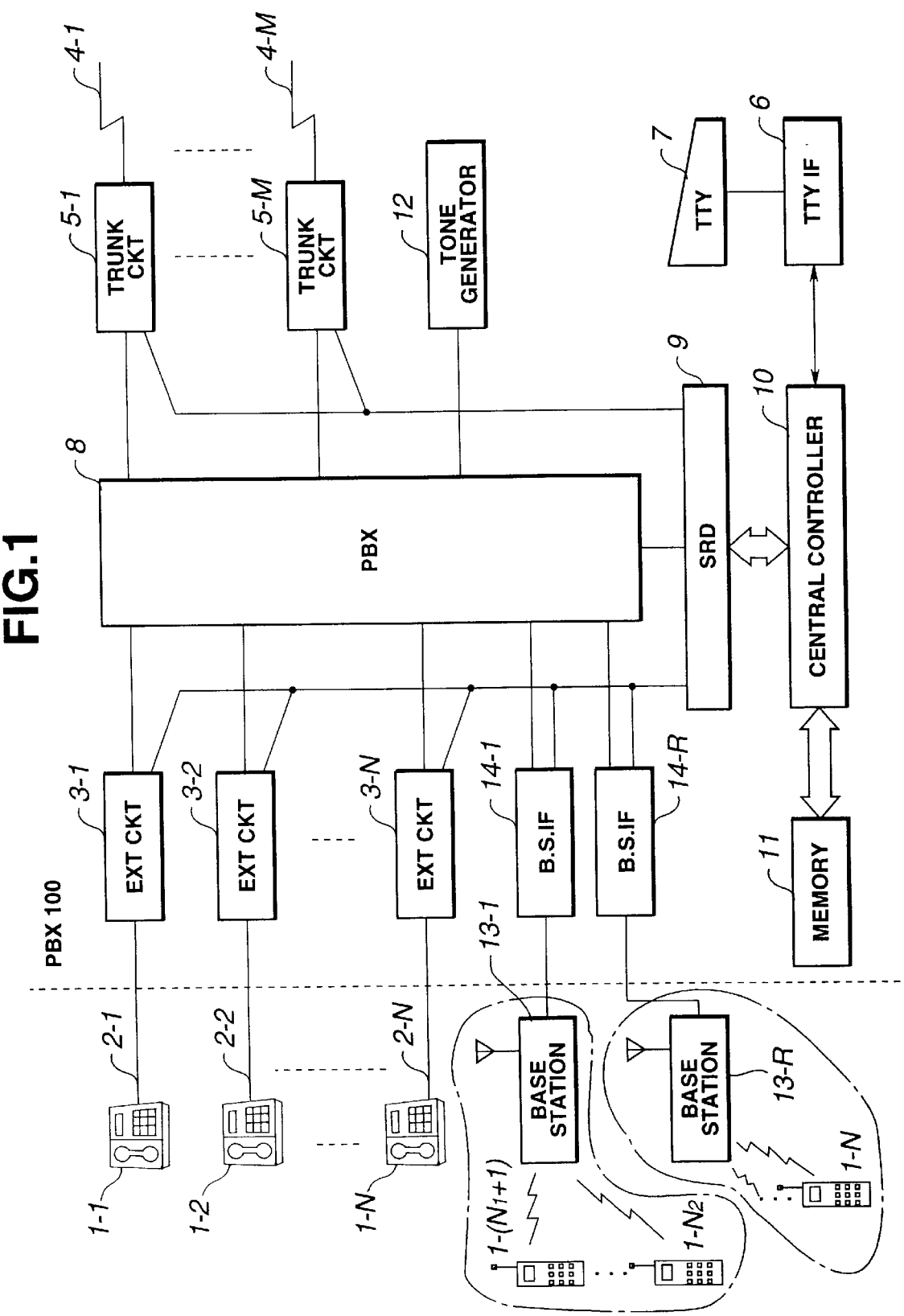
FIG. 1 shows an exemplary PBX system to which the present invention is applied.

FIG. 1 is a block diagram or an exemplary PBX system to which the present invention is applied. In FIG. 1 the PBX system comprises a PBX 100, a plurality of fixed telephone terminals 1-1 through 1-N and a plurality of mobil telephone terminals 1-($N_1$+1) through 1-N which are served by the PBX 100 (N: an integer, $N_1 \leq N$), extension lines 2 each connecting one of the fixed telephone terminal 1-1 through 1-N to the PBX 100, base stations 13 which relay between the PBX 100 and the mobil telephone terminals 1-($N_1$+1) through 1-N and M trunk lines 4 connecting the PBX 100 and an exchange office (not shown) serving the PBX 100. The fixed telephone terminals 1-1 through 1-N and the mobil telephone terminals 1-($N_1$+1) through 1-N are referred to en bloc as "telephone terminals 1" or "extension terminals 1"

The PBX 100 further comprises extension circuits 3 connected one-to-one with extension lines 2 for monitoring the extension lines 2 and controlling a calling and receiving from and to the telephone terminals 1-1 through 1-$N_1$ connected thereto, base station interfaces (IFs) 14, trunk circuits 5 for controlling a transmission and a reception of a call to and from the trunks 4 connected thereto, a switch 8 for performing a connection and disconnection within a group comprising extension circuits 3 and channels of the base station IFs 14 and a connection and disconnection between the group comprising the extension circuits 3 and channels of the base station IFs 14 and a group of the trunk circuits 5, a tone generator 12 for generating, e.g. a ring back tone RBT and a busy tone BT, a central controller 10 for controlling operations of the above described elements, a signal receiver and distributer (SRD) 9 for receiving and forwarding control signals between the central controller 10 and the extension circuits 3, base station IFs 14, trunk circuits 5, switch 8 and tone generator 12, and a memory 11 for storing a data base as will be detailed later and various kinds of data required for operation of the central controller 10.

The PBX 100 is also provided with a teletypewriter 7 for entering data via teletypewriter interface (TTY) 6.

Each of the base station IFs 14 is connected to a corresponding base station 13. In response to a reception of a call from a trunk 4 or an extension line 2 to a base station 13, each base station IF 14 sends to the PBX 100 a down control signal which means a call termination. And, in response to a call origination request from a base station 13, each base station IF 14 sends an up control signal to the PBX 100.

Figure 2:
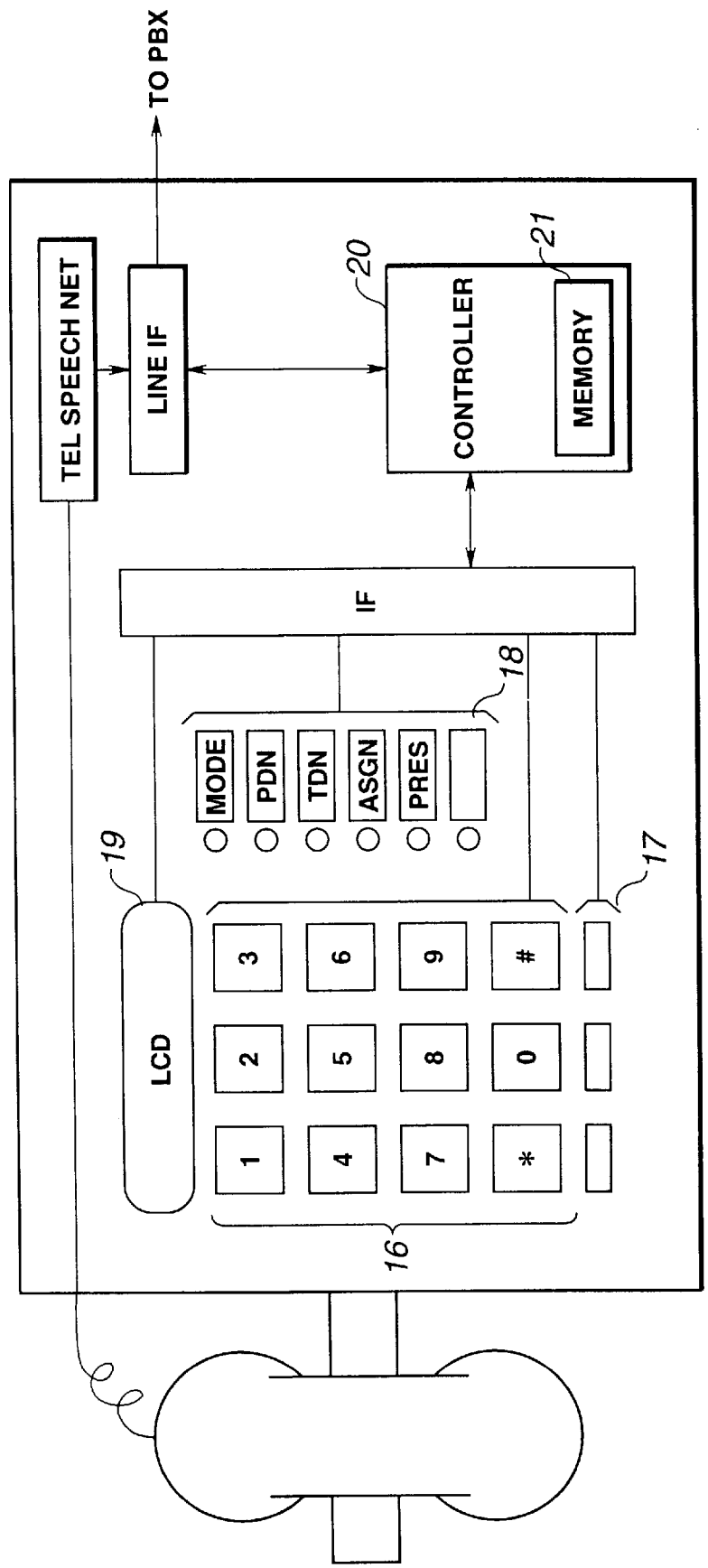
FIG. 2 shows an exemplary arrangement for the telephone terminals shown in FIG. 1.

FIG. 2 shows an exemplary arrangement for the fixed telephone terminals 1-1 through 1-N shown in FIG. 1. The fixed telephone terminal 1-1 shown in FIG. 2 is provided with ten keys 16, three function keys 17, six assignable keys 18 such as "MOOD", "PDN", "TDN" "ASGN", "PRES" and "(space)", and a liquid crystal display (LCD) 19 on the panel thereof, and has a controller 20 for realizing a stored program control system.

The mobil telephone terminals $1\text{-}(N_1+1)$ through 1-N can communicate each other directly or via a base station 13 and the PBX 100 under the control of radio links. Each of the radio links established between a base station 13 and a mobil terminal $1_j$ ($N_1+1 \leq j \leq N$) is time division multiplexed so that each frame comprises a plurality of transmitting slots and the same number of receiving slots, and the transmitting and the receiving slots are further multiplexed in time as is well known as a TDMA-TDD) method, causing each or the transmitting slots and each of the receiving slots to constitute a radio channel.

The connection ports of the PBX 100 to which the extension terminals 1 are connected have port numbers from 1 through N for identification. The extension telephone terminals 1 connected to the ports have unique terminal directory number, $TDN_1$ through $TDN_N$.

Each radio channel comprises a speech channel for transmitting and receiving voice and data and a control channel for transmitting and receiving various kinds of control signals for system information exchange, call origination and termination, and speech channel setting, etc. Each base station 13, which serves as a hub of a mobil telephone system, transmits control information through its control channel.

Control information from a base station includes system callig code. Each mobil terminal $1_j$ compares received callig code with a callig code stored in itself, and regards the information as valid if the comparison resulted in a coincidence or regards it as invalid to discard it if the comparison resulted in a noncoincidence.

If the comparison resulted in a coincidence the mobil terminal $1_j$ takes a synchronization with a logic control channel (LCCH) information to receive control information and waits for an incoming call addressed thereto. In order for a mobil terminal $1_j$ to originate a call, the terminal $1_j$ transmits a calling signal including the system callig code to the base station to which the terminal $1_j$ belongs via a control channel. In response to a reception of the calling code, the base station 13 establishes a speech channel, thereby enabling a start of a conversation.

Thus, even if a terminal $1_j$ receives a calling signal, if the calling signal is not received by a base station 13 whose system callig code is identical to the system callig code of the terminal $1_j$, the call origination by the terminal $1_j$ will end in failure because a base station 13 which received a calling signal including a wrong system callig code would discard the calling signal as invalid.

In case of a direct call between mobil terminals, a calling mobil terminal $1_j$ again transmits a calling signal including a system callig code to a called mobil terminal, and waits for a response signal from the called terminal.

Figure 3:
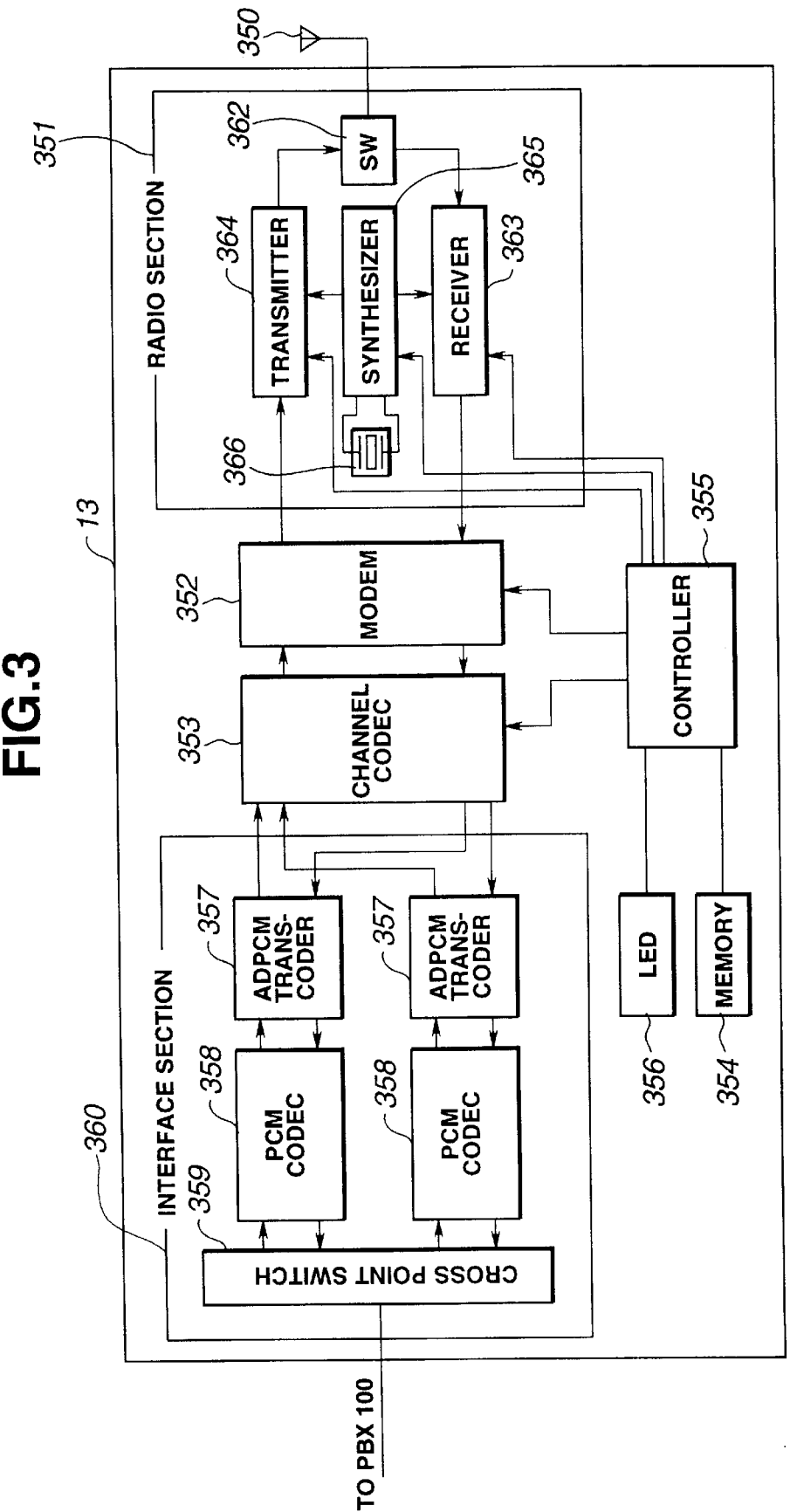
FIG. 3 is a block diagram showing an exemplary arrangement for the base stations 13 shown in FIG. 1.

FIG. 3 is a block diagram showing an exemplary arrangement for the base stations 13 shown in FIG. 1. The base station 13 comprises an antenna 350, a radio section 351, a modem 352, a channel codec 353, a memory section 354, a controller 355, LEDs 356, and an interface section 360 for connecting to a line.

The interface section 360 comprises ADPCM transcoder 357, PCM codec 358 and a cross point switch 369, and is, under the control of the controller 355 for converting a speech or control signal from the PBX 100 into a PCM signal to supply the PCM signal to the channel codec 353 and for converting a decoded signal from the channel codec 353 into a PCM signal to supply the PCM signal to the PBX 100.

The channel codec 353 is for extracting a signal in each first predetermined time slot from the demodulated output in a time division multiple access (TDMA) format from the modem 352 to output the extracted signal, and for inserting in each second predetermined slot a pulse-code-modulated signal output from the interface section 360 into a signal in the TDMA format to output the signal in the TDMA format to the modem 352.

The radio section 351 comprises a switch (SW) 362 for timely switching a transmitting system and a receiving system, a receiver 363, a transmitter 364, a synthesizer 365, and an oscillator 366.

The receiver 363 frequency-converts and amplifies a radio frequency (RF) signal received through the antenna 350 and detecting a signal component to output the signal component to the modem 352. The transmitter 364 is for modulating a carrier with a transmission signal from the modem 352 to yield an RF signal and supplies the RF signal to the antenna 350 for transmission. The synthesizer 365 is for supplying a desired frequency to the receiver 363 and the transmitter 364.

The modem 352 is for demodulating an intermediate frequency signal output from the receiver 363 of the radio section 351 to extract and output a signal component to the channel codec 353, and for modulating a transmission signal output from the channel codec 353 in a quadrature modulation method such as a quadrature phase shift keying (QPSK) and supplying the modulated signal to the transmitter 364 in the radio section 351.

The memory section 354 is for storing various data, and includes a password memory area, where there are stored an ID of own system, various passwords, and a system callig code, etc.

The controller 355 performs a control of each element including a control involved in transmission and reception, and comprises a password tester (not shown) for testing a validity of a password in a control of connection between a base station 13 and a mobil telephone terminal 1$j$ and a password memory controller (not shown). The password tester compares a received password with a predetermined password stored in the password memory area to see if the two passwords coincide. The password memory controller writes and reads password information in and from the password memory area in the memory section 354. The controller 355 further comprises a password input controller (not shown). On the basis of an operation of a predetermined function key and subsequent operations of ten keys, the password input controller converts each of various kinds of passwords to be stored in the password memory area into a binary code to cause a predetermined number of digits of the binary code to be stored in the password memory area, where the predetermined number has been determined in advance depending on the kind of the password.

Figure 4:
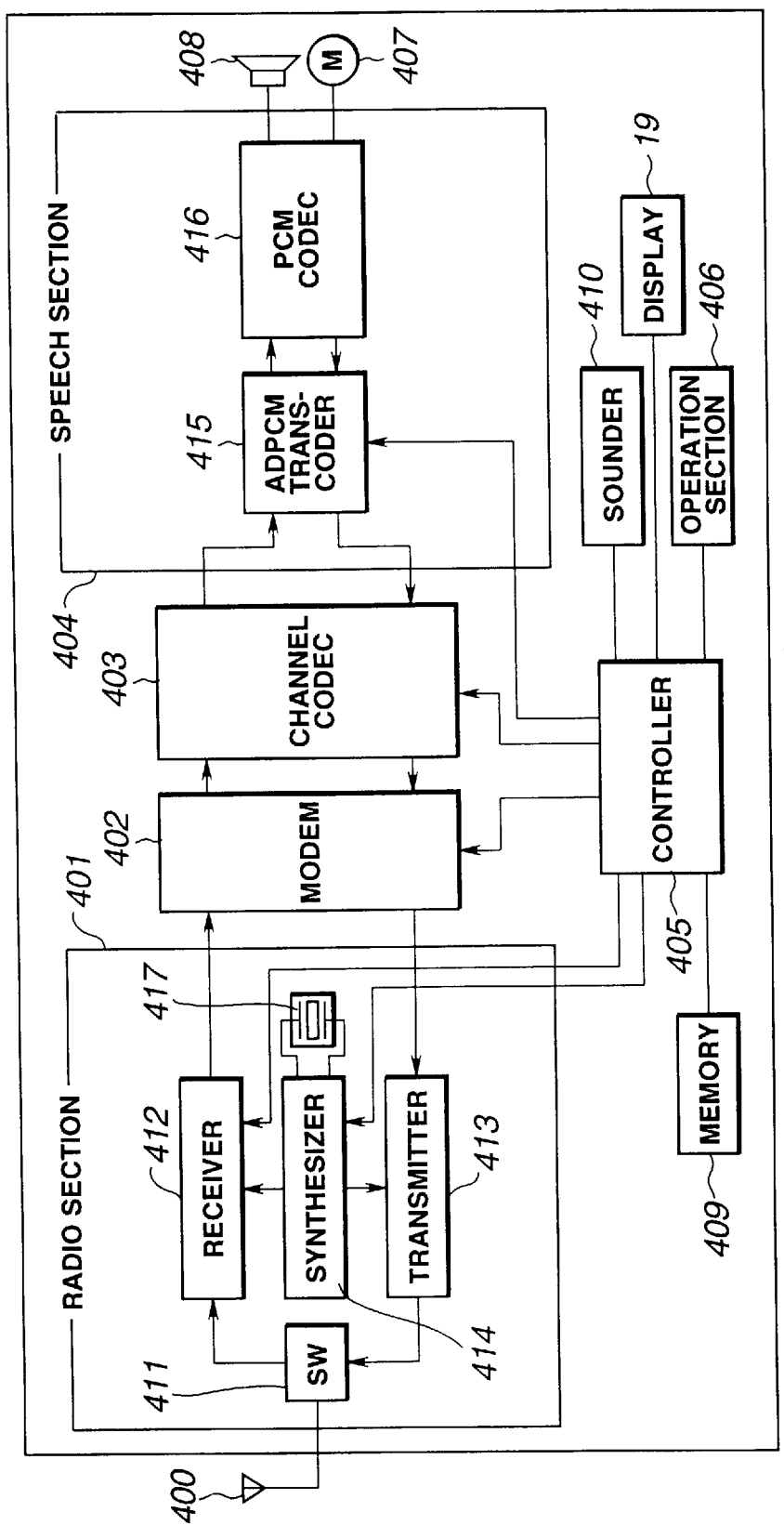
FIG. 4 is a block diagram showing an exemplary arrangement for the mobile stations shown in FIG. 1.

FIG. 4 is a block diagram showing an exemplary arrangement for a mobil telephone terminal $1_j$ shown in FIG. 1. The terminal $1_j$ is of a type provided with a display 19 such as LCD FIG. 4, the mobil telephone terminal $1_j$ comprises an antenna 400, a radio section 401, a modem 402, a channel codec 403, a speech section 404, a controller 405, a an operation section 406, a microphone 407 for converting voice into an audio signal, a loudspeaker 408 for outputting voice, a memory section 409, and a sounder 410 for generating various kinds of tones.

The radio section 401 comprises a switch (SW) 411 for timely switching a transmitting system and a receiving system, a receiver 412, a transmitter 413, a synthesizer 414, and an oscillator 417.

The receiver 412 frequency-converts and amplifies a radio frequency (RF) signal received through the antenna 400, and detects a signal component to output the signal component to the modem 402. The transmitter 413 is for modulating a carrier with a transmission signal from the modem 402 to yield an RF signal and supplies the RF signal to the antenna 400 for transmission. The synthesizer 414 is for supplying a desired frequency to the receiver 412 and the transmitter 413.

The modem 402 is for demodulating an intermediate frequency signal output from the receiver 412 of the radio section 401 to extract and output a signal component to the channel codec 403, and for modulating a transmission signal output from the channel codec 403 in a quadrature modulation method such as a quadrature phase shift keying (QPSK) and supplying the modulated signal to the transmitter 413 in the radio section 401.

The channel codec 403 is for extracting a signal in each first predetermined time slot from the demodulated output in a time division multiple access (TDMA) format from the modem 402 to output the extracted signal, and for inserting in each second predetermined slot a pulse-code-modulated signal output from the speech section 404 into a signal in the TDMA format to output the signal in the TDMA format to the modem 402.

The speech section 404 serves as an input/output interface for audio signals, comprises an ADPCM transcoder 415 and a PCM codec 416, and, under the control of the controller 405, PCM-modulates the audio signal from the microphone 407 to feed the next stage or a TDMA section comprising the channel codec 403 and the modem 402, and converting a demodulated PCM signal into an audio signal to feed the loudspeaker 408.

The memory section 409 is for storing various data, and includes a password memory area, where there are stored not only a system ID or a base station ID which is initially set and is an 1D for identifying the base station which serves this mobil telephone terminal $1_j$, but also an individual or a terminal ID for identifying the carrier of the terminal $1_j$, an extension number assigned to the terminal $1_j$ by the base station serving the terminal $1_j$, a system callig code, optional information, directory numbers, an enterprise code, etc.

The controller 405 performs a control of each element including a control involved in transmission and reception, and comprises a password tester (not shown) for testing a validity of a password in a control of connection between a base station 13 and a mobil telephone terminal $1_j$ and a password memory controller (not shown). The password tester compares a received password with a predetermined password stored in the password memory area to see if the two passwords coincide. The password memory controller writes and reads password information in and from the password memory area in the memory section 409. The controller 405 further comprises a password input controller (not shown). On the basis of an operation of a predetermined function key and subsequent operations or ten keys, the password input controller converts each of various kinds of passwords to be stored in the password memory area into a binary code to cause a predetermined number of digits of the binary code to be stored in the password memory area, where the predetermined number has been determined in advance depending on the kind of the password.

The operation section 406 comprises function keys and ten keys, for use in originating and answering a call, entering a number, terminating a communication. Operation of the function and ten keys enables an input for these features. Also, operating a "set" key of the function keys and ten keys enables a setting of a base station ID and a mobil station ID under the control of the controller 405.

In the first embodiment, such a situation is assumed that the mobil telephone terminals belong to a company and are used by company members in need thereof in turn. It is also assumed that the PBX 100 is an analog exchange provided with ISDN, modules. As apparent from the above description, the mobil telephone terminals 1-($N_1$+1) through 1-N play, as telephone terminals which are served by the PBX 100, the same roles as the fixed telephone terminals 1-1 through 1-$N_1$. For this reason, a fixed and mobil telephone terminal are hereinafter referred to respectively as "a telephone terminal 1" without discrimination.

Virtual Terminal

Figure 5:
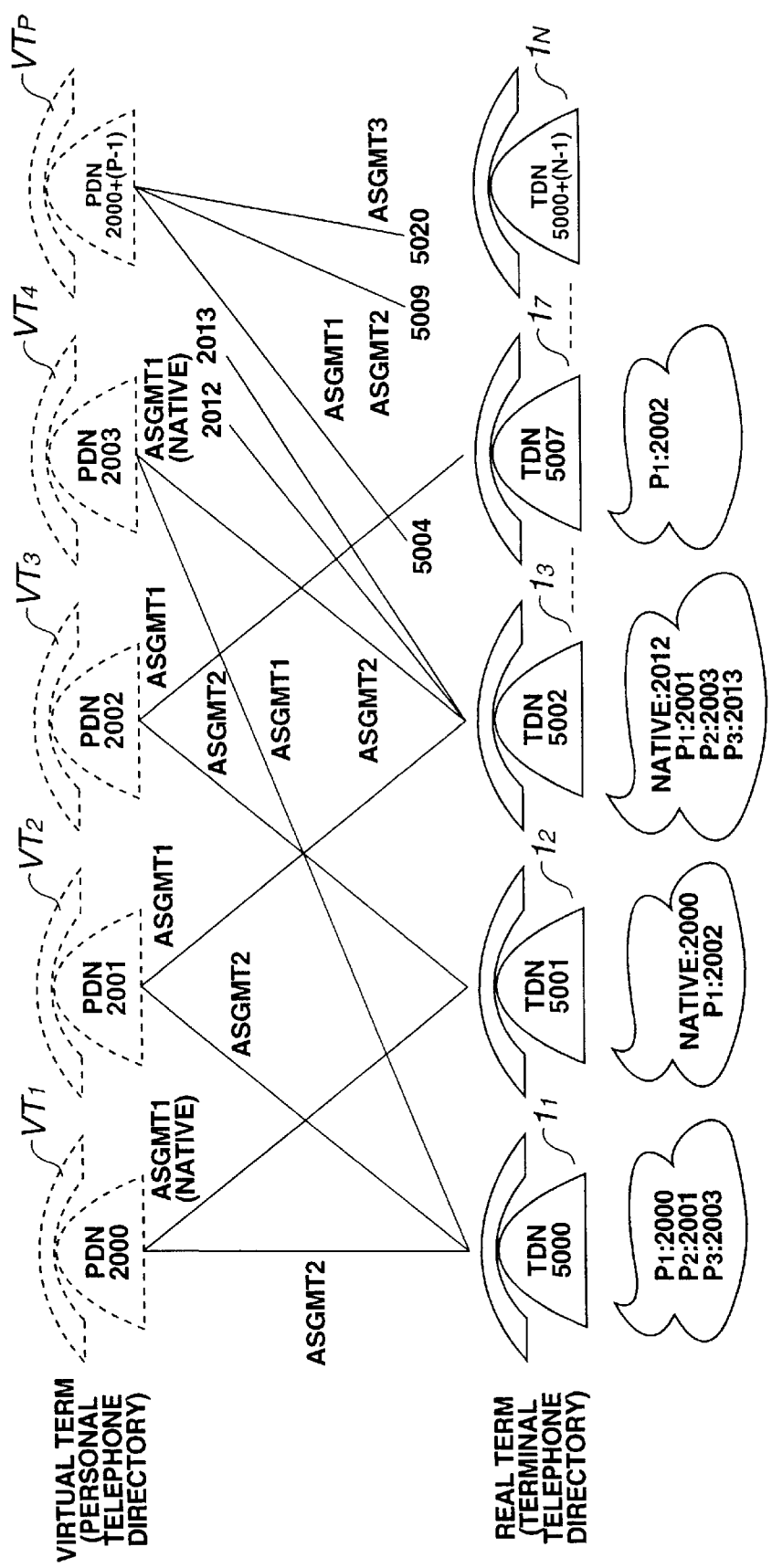
FIG. 5 illustrates an example of assignments of virtual terminals to real telephone terminals.
Figure 6B:
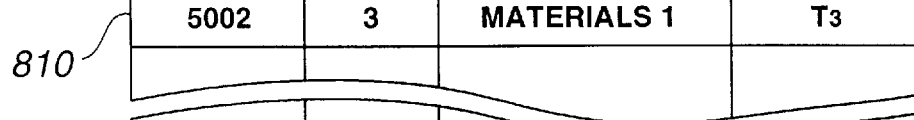
Figure 7A:
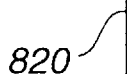
Figure 14:
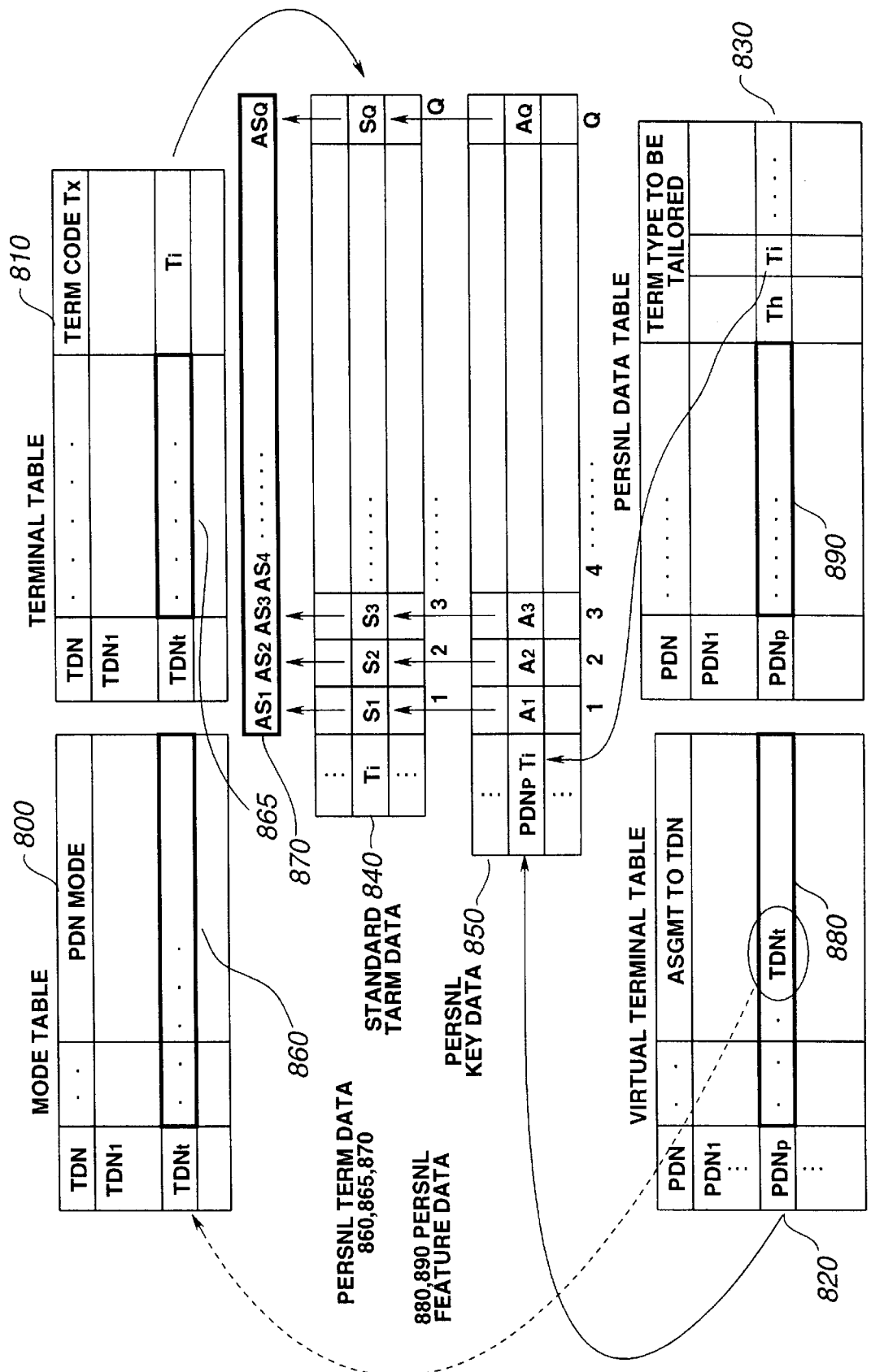
FIG. 14 is a diagram showing relations among tables shown in FIGS. 6 through 8, 10, and 12, which constitutes the data base or the invention.

Referring now to FIGS. 5, 6, 7A and 7B, concept of a virtual terminal will be described in the following. FIG. 5 illustrates examples of assignments of virtual terminals (or personal directory numbers) to real telephone terminals 1 (or terminal directory numbers). FIGS. 6A and 6B show respectively a mode table 800 and a terminal table 810, each record of which has a key field containing a terminal directory number (TDN) of each of the telephones 1 served by the PBX 100 shown in FIG. 1 the mode table 800 further comprises fields of personal directory numbers (PDNs) which have been assigned to the TDN, and the terminal table 810 further comprises fields of other data on the terminal 1 with the TDN. The mode table 800 and the terminal table 810 are referred to en bloc as TDN related tables, and may be embodied as one table. FIGS. 7A and 7B show respectively a virtual terminal (VT) table 820 and a personal data table 830, each record of which has a key field containing a PDN of each of the users, the VT table 820 further comprises fields of TDNs of the real terminals 1 to which the PDN has been assigned, and the personal data table 830 further comprises fields of personalized data on telephone features. The VT table 820 and the personal data table (PDT) 830 are referred to en bloc as PDN related tables, and may be embodied as one table. Relations among the above described tables are shown in FIG. 14. FIG. 14 is a diagram showing relations among tables in the data base of the invention.

In order to facilitate the understanding of the following description, it is useful to define some terms and notation concerning the table. A table (or a file) is a collection of records stretching horizontally from the left end to the right end thereof. A record is composed of one or more fields. In this embodiment, the first or left end field is the key field which uniquely identifies a specific record within the entire table. If one of the labels or field names at the top of the table is FFF, then the field is called the FFF field or the field of FFF. If the content or value in the field named FFF in the record containing RRR in its key field (or RRR record) in the TTT table is XXX, it is herein expressed as V(FFF, RRR, FFF)=XXX. However, if the file name is thought to be apparent from the context, it is expressed as V(, RRR, FFF)=XXX. For example, V(mode, 5002, NATIVE VT)=2012, V(personal data, 2002, SERVICE FLAG)=07H V(personal data, 2002,)=the values in all the fields of the 2002 record of the personal data table, V(personal data,, SERVICE FLAG)=the entire values in the SERVICE FLAG field of the personal data.

In the embodiment using the PBX 100, a class of service is assigned to each of the users, thereby prescribing the kinds of trunk calls available to the user, and each user may set various kinds of personalized data in such the course of the use of the user's telephone terminal 1 as utilizing speed calling, assigning functions to function keys, etc. These data are associated with at least the PDN or the user and stored in the memory $1_1$ connected to the central controller 10 in the PBX 100 for use in the control of the central controller 10.

It is assumed that the memory $1_1$ stores tables shown in FIGS. 6A, 6B, 7A and 7B. Since for example V(PDN related, 2002, ASGMT)=5007 and 5001, we discuss the case in which V(,2002, NAME)=PRESIDENT places a call from the terminal 1 with a TDN of 5001 (such terminal being, hereinafter, referred to as terminal 5001). In this case, the central controller 10 provides a control for the telephone terminal 5001 on the basis of not only relevant personalized terminal data of V(TDN related, 5001,) and personalized feature data of V(PDN related, 2002,) but also personalized (customized) key data 870 obtained by processing standard (default) terminal data for terminal type code T1 with the data or V(personalized key, 2002 T1,) as detailed later, because the terminal type code for the terminal 5001 is V(TDN related, 5001, T-TYPE CODE)=T1 and the terminal types PRESIDENT desires to customized are V(PDN related, 2002, TO-BE-CSTMD T-TYPES)=T1 and T3. By doing this, PRESIDENT can use the terminal 5001 at the place of V(TDN related, 5001, PLACE)=SECRETARY in the same telephone circumstance as provided by PRESIDENT's own terminal. Further, as described in detail later, if some user places a call by (dialing the PRESIDENT'S) PDN or 2002 when a presence registration of PRESIDENT is recorded for a telephone terminal 1 placed near the PRESIDENT's current position, even if the user have no idea of where PRESIDENT is, the user is connected to PRESIDENT. From these point of view, a set of personalized data—personalized terminal, feature and key data—associated with both TDN and PDN can be considered to be a virtual terminal which the user of the PDN can use through the terminal of the TDN. The setting of the personalized data will he described later.

FIG. 5 illustrates a situation in which P virtual terminals (personal directory numbers) are assigned to N real telephone terminals (terminal directory numbers). In FIG. 5, the real terminals $1_1$ through $1_N$ have terminal directory numbers 5000 through 5000+(P-1) which correspond to ordinary extension numbers, while the virtual terminals $VT_1$ through $VT_P$, have personal directory numbers 2000 through 2000+(P-1) assigned thereto. As seen from FIG. 1, each user is permitted to assign his or her own virtual terminal $VT_i$ to any real terminals $1_j$. For example, a use r with a PDN=2000+(P-1) has assigned his or her VT to three rea 1 terminals 5004, 5009 and 5020.

Operation Adapted to the Kind of a Telephone

If various kinds of telephone terminals 1 are connected to the PBX 100 in this kind of system, it is impossible to provide all the terminals 1 with the same features in the same way. For the purpose of coping with this problem, the PBX 100 advantageously adapts its operation to the type of the telephone terminal 1 in use when even an identical user uses different telephone terminals 1 in the user's personal mode. If a certain terminal 1 is connected, for example, to a digital extension line, control signals can he exchanged via control line between the terminal 1 and the PBX 100. On the other hand, a telephone terminal 1 connected to an analog extension line is supported only with such features as can be provided through the speech line. For this reason, all of the telephone terminals 1 are classified into terminal types by attributes such as the type of extension line (fixed or mobil, and analog or digital) used in the PBX system, the type of telephone terminal 1 (e.g. whether the terminal 1 sends data input by the user one by one at each time of input or sends a collection of such data at a time as call defining information, and resource which the terminal is provided with, etc.) connected to each extension line type. A table as shown in FIG. 8 is created on the basis of the classification. FIG. 8A is a terminal attribute table showing basic and supplementary services supported for the terminals of the terminal types determined by line attributes and terminal attributes in the embodiment as shown in FIG. 1. In a terminal attribute table in FIG. 8A, a value of 0: YES or available, and a value of 1: No or unavailable.

FIG. 9 illustrates telephone environments provided by the terminals 300 and 310 whose TDNs=xxxx-5001 and xxxx-5007 and which the user with a PDN=xxxx-2002 (PRESIDENT as seen from FIG. 7B) has assigned his or her PDN to. The telephone terminals 1 to which PRESIDENT have assigned his or her PDN are terminals 5001 and 5007 as seen from FIG. 7A and described above. Then, the terminal type of the terminal 5001 is T1 as seen from the T-TYPE field in FIG. 6B, and the terminal type of the terminal 5007 is assumed to be T5 (not shown in FIG. 6B), as shown in FIG. 9. Referring now to FIG. 8B, it shows exemplary contents of the terminal attribute flag (T. ATTRIB.) field shown in FIG. 8A, that is, the availability of each resource in each terminal. It is seen from FIG. 8B that the terminal 5001 is a fixed analog terminal with a loudspeaker, and the terminal 5007 is a mobil digital terminal which is provided with a loudspeaker and a display of 32 characters×6 lines and which is of a type that sends a predetermined piece of data input by key operations as call defining information in a packet. Also, the contents of the SERVICE FLAG field of the personal data table 830 of FIG. 8B are shown in FIG. 7C. The telephone services permitted to PRESIDENT is indicated by b4 and the succeeding flag bits in the service flag 320 (shown in FIGS. 7C and 9) of the personal data table 830 of FIG. 7B. From this point of view, PRESIDENT can not use service $SV_3$ and $SV_{k+2}$ at the terminal 5001 though the services are permitted to PRESIDENT while PRESIDENT can utilize all of the services permitted to PRESIDENT at the terminal 5007.

We will discuss how the central controller 10 operates.

1. It is assumed that PRESIDENT whose PDN=2002, at the terminal 5001, takes an action for causing the terminal with a TDN=5001 to enter the personal mode for PDN=2002. On receiving a command for making the terminal 5001 in the terminal mode for PDN=2002, the central controller 10 searches the data base in memory 11 to associate the terminal 5001 with:

personalized feature data or V(PDN related, 2002,)=V (VT, 2002,) 880+V(personal data, 2002,) 890;

personalized terminal data or V(TDN related, 5001)=V (mold, 5001,) 860+V(terminal, 5001,) 865

(where V(terminal, 5001, T-TYPE CODE)=$T_1$) =V(mode, 5001,) 860+V(terminal, 5001,) 865+V (term. attrib., $T_1$,) 847; and personalized key data 870 shown in FIG. 14 which are obtained as detailed later. This causes the terminal 5001 to enter a personal mode for PDN=2002. The personalized feature data and the personalized key data are referred to as PDN dependent data because these data vary depending on the PDN.

2. If the controller 10 receives a series of dial pulses or dial tones representative of a service request from the terminal 5001, then the controller 10 search the flag bits 320 following the bit b4 in V(personal data, 2002, SERVICE FLAG) 830 and the record V(term. attrib., $T_1$,) 847 of FIG. 8A to see if the requested service is recorded respectively as permitted and available in both the table. If so, the controller 10 execute the service. If the service is permitted in the flag bits 320 but recorded as unavailable in V(term. attrib., $T_1$,) 847, then the controller 10 informs the terminal 5001 of the fact by using a voice guidance trunk (not shown) of the PBX 100.

It is further assumed that the service identified by the service code $SV_k$ is "caller number indication." Then, receiving a call addressed to terminal 5001, the central controller 10 searches the terminal attribute flag V(term. attrib., $T_1$, T-ATTRIB) of FIG. 8A (specifically shown in FIG. 8B) to find that the terminal 5001 has a loudspeaker (not shown), and again informs the terminal of the directory number of the caller of the call by using the voice guidance trunk while causing ring back tones to be sent from the tone generator 12 to the terminal 5001. If the call is addressed to the terminal with a TDN=5007, since the terminal type of the terminal 5007 is $T_5$ as mentioned above, it is found from the terminal attribute flag V(term. Attrib)., $T_5$, T-ATTRIB) of FIGS. 8A and 8B that the terminal 5007 has a display of 32 characters×6 lines and is connected to a digital extension line, so that the controller 10 sends a caller directory number in a predetermined data format to the terminal 5007 via D channel to cause the caller number to be displayed on the 32×6 display.

As described above, according to one aspect of the invention, the central controller 10 of the exchange 100 adapts its operation to the attributes of the line and the terminal to serve in the exchange system. Accordingly, the present invention can he embodied in a wide variety of forms without being limited by the kinds of the terminals.

VT Assignment and Data Structure

The PERSONAL (Pi) MODE fields of the mode table 800 of FIG. 6A and the assignment fields of the VT table 820 of FIG. 7A are a kind of inverted files to each other.

The PDNs in the Pi MODE fields of the mode table 800 are arranged in order of an ascending scale, so that each mode appears in such order when displayed one by one from the left end. On the other hand, the TDNs in the ASGMT fields of the VT table 820 are labeled by integers just below the field name ASGMT, which each indicate the order of priority on call termination. That is, the TDNs in the ASGMT fields are arranged in order of descending priority on call termination (detailed later). Thus, the values in the Pi MODE and ASGMT fields are ordered and variable in number. Therefore, these fields may be realized as variable length fields using delimiters so as to facilitate an insertion and a deletion of value.

In FIG. 6A, the value of a Pi mode pointer "i" indicates the current mode of the relevant telephone terminal. Though we have mentioned the standard mode and the personal mode, we now define the possible modes of a telephone terminal 1. When a terminal is operated based on PDN dependent data associated with any PDN in the Pi MODE fields, the terminal is in the personal mode of the PDN. In response to an input for exiting from or terminating the personal mode, the PDN dependent data are changed to one associated with the PDN contained in the native virtual terminal (NATIVE VT) field. Accordingly, if any PDN exist in the NATIVE VT field, the terminal is said to be in the "native mode" of the PDN, and operated in the same way as in the personal mode of the PDN. Otherwise, the terminal is said to be in the standard mode, and operated on the basis of default PDN dependent data.

In the terminal table 810 of FIG. 6B, V(, a terminal, PLACE) indicates the place where the terminal is located, and is displayed on the LCD 19 of the calling terminal when a call address to a PDN is connected to the destination (Such a display will be described in detail later). V(, a terminal, PORT NO.) is the port number of the port of the PBX 100 to which the terminal is connected. V(, a terminal, T-TYPE) is the code for the terminal type of the terminal, and serves as a key data in the terminal attribute table or FIG. 8A and a default key table of FIG. 10.

FIG. 10 to is an exemplary standard (default) key table 840 which comprises default data for assigning functions to the keys of a terminal of each of the terminal types contained in V(term. attrib.,, T-TYPE) of FIG. 8A in the event the terminal type is not contained in (personal data, a PDN), TO-BE-CSTMZD T-TYPES) of FIG. 7B. FIG. 11 is a table showing an action of PBX 100 for each function code labeled $FC_i$ wherein a function code which is sent from a telephone terminal to the PBX 100 when one of the keys is pressed at the terminal is labeled with a function code name $FC_i$ In the default key table 840, each of the fields which correspond to the numerals 1 through (i+9) labeled above field names contains the identifier (ID) of the key which is set in default for the function code name $FC_i$. Also, 20 fields labeled with the numerals from (i+10) to (i+29) contains the names of the function codes of functions which is assigned in default for assignable keys $AK_1$ through $AK_{20}$.

We now take as an example a terminal whose terminal type is specified by a terminal type code, e.g. $T_1$. Then, if the terminal is in the standard mode, it is seen from V(default key, $T_1$,) of FIG. 10 that in the terminal, default functions identified by code names $FC_1$ through $FC_6$ are assigned to the function keys which are identified by "*", "#", "MODE", "PDN", "TDN", "ASSGN", respectively and functions identified by code names FC $_{i+2}$ through $FC_{i+5}$, $FC_i$, $FC_{12}$ and $FC_7$ are assigned to the assignable key $AK_1$ through $AK_6$ and $Ak_{10}$, respectively. This situation is shown in FIG. 13A. FIG. 13A shows key configurations in case when default data are set as PDN dependent data to a terminal of the terminal code $T_1$ (that is, the terminal is in the standard mode).

As described in connection with the example, the invention provides a default key table which defines default function assignments to keys for each terminal type as shown in FIG. 10. Also, FIG. 12 shows in a simplified form a personalized key table each record or which comprises personalized key data 850 for the terminal type, of the terminal the user desires to customize, which is contained in V(personal data, the user's PDN, TO-BE-CSTMZD T-TYPES) of FIG. 7B. In FIG. 12, a key customized code contained in a KEY CSTMZ CODE field is a combination of the user's PDN and the terminal type code $T_i$ of the terminal type the user desires to customize. For example, the fact that V(pers. key, 2002 T1, 3)=$FC_6$ means the user 2002 has assigned the function identified by FC6 to the key V(default key, $T_1$, DK for $FC_3$).

If a user with a PDN=2002 changes the function assignments to keys for the terminals of a type $T_1$, the central controller 10 searches V(pers. key,, KEY CSTMZ CODE) for 2002 T1. If 2002 $T_1$ is not found, then the record 2002 $T_1$ is created, and in the created record desired function code names are recorded in the fields of the same field numbers as those of the fields of V(default key, $T_1$, ) which contain the identifiers of the keys to which the desired function codes are to be assigned, referring to FIGS. 11 and 13. If 2002 $T_1$ is found, then, in the found record, the contents or values in relevant fields is changed to desired values, and/or desired function code names are recorded in relevant fields in the same way as in case of the creation or 2002 $T_1$. Thereafter, if the user makes a terminal of a type $T_1$ in a personal mode of 2002, the user can use the terminal in a desired circumstance, because the desired values are linked to the terminal. The key configuration in this case is shown in FIG. 13B.

Returning now to the PDN related tables of FIGS. 7A and 7B, the data structure will be described in the following. In the tables, a NAME field contains a name or post of the user of the PDN which is used for display. As described above, if a user has registered his or her presence for a terminal, a PRSNT AT field of the user's record contains the PDN of the terminal. For example, it is seen that the user with a PDN=2000 or SECRETARY is present at the terminal 5001, which is at SECRETARY's place as further seen from V(term., 5001, PLACE)=SECRETARY. Also, at least C. Louis, PRESIDENT and B. WHITE are near the terminal 5000+(N-1), that is, at V(term., 4999+N.)=BOARD R. 3.

In operation, if a call is originated by dialing a PDN, the central controller 10 first examines V(VT, the PDN, PRSNT AT) to see if it contains any TDN. If so, and if the terminal of the TDN is not busy, then the call is connected to the terminal. If V(VT, the PDN, PRSNT AT) is vacant, the call is connected to the terminal which has the highest priority on termination or placed at the most left position among the idle terminals of V(VT, the PDN, ASGMT). Therefore, even when a caller does not know where a person to call is, if the person to call has registered his or her presence, a call originated by dialing the PDN of the called person is advantageously connected to the called person.

The personal data table 830 of FIG. 7B further comprises the fields of: ID or PASSWORD for containing an predetermined-length ID or password which the controller 10 request the user to enter before an execution of such features that would cause a trouble if abused by others, e.g. a presence registration; SERVICE FLAG; TIME OUT (sec.); TEMP-T. MODE PERIOD for containing a time period for which the user desires to keep the terminal in a temporary terminal mode; SUBSCRIBER PDN, which is necessary only when the invention is applied to a PSTN, so will be detailed later.

The temporary terminal mode is a feature for keeping the terminal in a personal mode for a preset period of time. This feature is especially advantageous when a user knows in advance that he or she is to use or occupy a specific telephone continuously, as in case of a shift work. This feature is especially useful for incoming call related telephone feature such as inhibiting ringing, call screening, etc.

The contents of SERVICE FLAG field varies drastically depending on whether the invention is applied to a PBX system or a PSTN system. We limit our explanation to the service flag for the first embodiment as shown in FIG. 7C. Service flag for a PSTN system will be described in detail later. In FIG. 7C, the least significant three bits indicate five classes of services with respect to trunk calls. In response to a receipt of call request, the central controller 10 provides service based on the value of these bits. The bit b3 is used for determining if the terminal is in the temporary terminal mode or not. If so, the central controller 10 disables the time out function until the time period for the temporary terminal mode expires.

Operations

First, the structures of the tables 800, 810, 820, 830, 840 and 845 are defined. Then, the following data are registered or entered: TDNs and initial value for the $P_1$ mode pointer of the mode table 800; the terminal table 810; PDNs of the virtual terminal table 820; PDNs, names, and service flags of the personal data table 830; the default key table 840; and the terminal attribute table 845. As described above, the tables with an identical key field may be embodied as a single table. The structure definition and the data entry for these tables are done by operator through the teletypewriter 6. By doing this, the foundation of the data base is established in the memory 11 of the PBX 100. Note that, in registration in the mode table 800, putting an EOF (end of field) code in the first field of the $P_i$ MODE fields will facilitate a future processing.

How the user assigns his or her virtual terminal or PDN to a real terminal or the TDN of the terminal will be described in the following. For doing this, the user places a call from the terminal to which the user desires to assign his or her PDN to the PBX 100. In response to the connection of the call to the PBX 100, the user presses an ASGN key 18 of FIG. 2, and enters an ID which has been registered in the ID or PASSWORD field of the personal data table 830 shown in FIG. 7B. The data for the ASGN key and the ID are transmitted to the central controller 10 via the extension circuit 3 to which the terminal is connected and the SRD 9.

Figure 15:
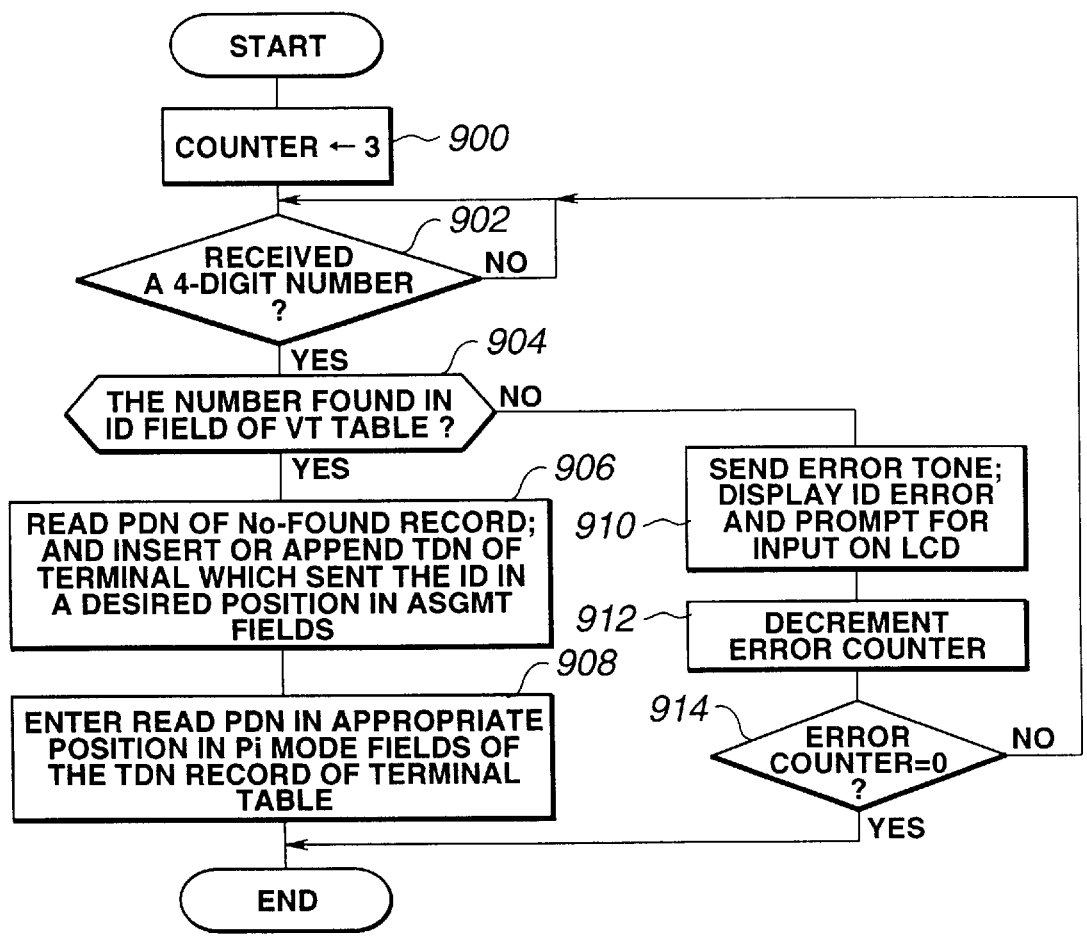
FIG. 15 is a flow chart showing a procedure for assigning a PDN to a TDN.

FIG. 15 is a flow chart showing actions of the central controller 10 under the control of a program for assigning a PDN to a TDN. In FIG. 15, in response to receptions of a call from a telephone terminal 1 and the code for the ASGN key subsequently sent from the telephone terminal 1 which sent the call, the central controller 10 invokes a program for assigning a VT (virtual terminal) associated with a PDN to a real terminal 1 (START). Then, under the control of the program, the central controller 10 sets an error counter (not shown) in the memory 11 for 3 in step 900, and tries to receive a number of 4 digits, nnnn, in step 902. In response se to a reception of nnnn, the control is passed to decision step 904 which tests V(personal data,, ID) or PASSWORD,) of FIG. 7B to see if the number nnnn is found. If so, the control is passed to stop 906 which retrieves the PDN contained in the record where nnnn was found, retrieves the TDN of the terminal from which nnnn is received from the record of the terminal table of FIG. 6B which contains the port number of the terminal which has been sent from the terminal, and stores the TDN in an appropriate field of V(VT, the PDN, ASGMT) so that the entire fields of V(VT, the retrieved PDN, ASGMT) of FIG. 7A are arranged in order of descending priority on call termination. The control proceeds to step 908 which stores the retrieved PDN in an appropriate field of V(mode, the retrieved TDN, PERSONAL, (Pi) MODE) of FIG 6A so that the entire field of V(mode, the TDN, PERSONAL, (Pi) mode) are arranged in order of an ascending scale, and the control ends. If the number nnnn is not found in decision step 904, then the control is passed to step 910 which returns an error tone and prompts the user to enter his or her password again while causing such contents to be displayed on the LCD 19 of the terminal. Then, the control proceeds to step 912 which decrements the error counter, and proceeds to decision step 914 which determines if the error counter=0. If so, the control is terminated. Otherwise, the control is returned to step 902.

In order to register a PDN as a native VT instead of an ordinary VT, the ASGN key is pressed in a predetermined manner, e.g. twice at an interval shorter than a predetermined time period. It is noted that only one native VT is permitted to each terminal. Accordingly, if the number nnnn is found in step 904, the central controller 10 tests the value V(mode, V(terminal, the received port number, TDN NATIVE VT) to see if the value is any PDN. If so, the central controller 10 cause a message to the effect that the native VT has been already set to be displayed on the LCD 19 of the terminal, and exits from the program. Otherwise, the controller 10 stores the user's PDN contained in the PDN field of the record containing the number nnnn in the personal data table of FIG. 7B in the vacant NATIVE VT field for which the test was made, and exits from the program.

Processing of a call will be described in the following. Each of the telephone terminals 1 is either in the standard mode or in a personal mode including the native (VT) mode. In either mode, a call can be originated by dialing a TDN or a PDN. Thus, four cases are possible. It should be noted that there is no difference in control operation between the personal mode and the native. The only difference between both modes lies in the durations of modes or the ways of termination of the modes. Specifically, from the point of mode switching, the native mode belongs to the same category as the standard mode, that is, an automatic termination of a personal mode results in entering either the standard or the native mode. Since mode switching is not discussed here, the native and the personal mode are treated equally.

In origination of a call in the standard mode, the central controller 10 controls the terminal on the basis of the standard key data 842 recorded in the record which have as the key data the terminal type code of the terminal in the default key table of FIG. 10. Also, the central controller 10 uses a standard service flag set for the standard mode as the data in the field of the personal data table of FIG. 7B., but no longer requires the VT table nor the mode table.

In general, abbreviated dialing or automatic dialing are not be used in this mode. If such speed calling is required in the standard or it is required to usually keep a certain terminal in telephone environment adapted to a specific user, then a native mode associated with the specific user is advantageously used just like the standard mode by registering the PDN of the specific person in the NATIVE VT field of the record for the terminal in the mode table of FIG. 6A.

If a call is originated in the standard mode (S-mode) by dialing a TDN of a destination terminal, the call is connected to the destination terminal just like an ordinary extension line call. In this case, four items are displayed on the LCD 19 of each of the calling and the called terminal as follows. The "personal mode" is abbreviated to 'P-mode'.

Display on the LCD of the calling party,

| | |
|---|---|
| upper left: called TDN | upper right: called term. place |
| lower left: date | lower right: own TDN for S-mode or own PDN for P-mode |

Display on the LCD of the called party,

| | |
|---|---|
| upper left: caller TDN or PDN (according to caller mode) | upper right: caller place or name (according to caller mode) |
| lower left: date | lower right: own TDN for S-mode or own PDN for P-mode |

FIG. 16 is a diagram showing displays on LCDs of a calling and a called party in a call under various modes. Such case is assumed that for example a SECRETARY (PDN=2000) originates a call from his or her own terminal 5001 to PRESIDENT (PDN=2002). This assumption is valid till the next space line. FIG. 16A shows a case in which the terminal 5001 is in the standard mode, and the dialed number is the TDN of the terminal for which PRESIDENT is has registered his or her presence.

If a user originates a call from a terminal in the user's personal mode by dialing a TDN, the user can use the terminal in the same familiar telephone circumstance that the user's home base telephone provide even when the user is away from his or her home base. Exemplary display is shown in FIG. 16B.

Figure 17:
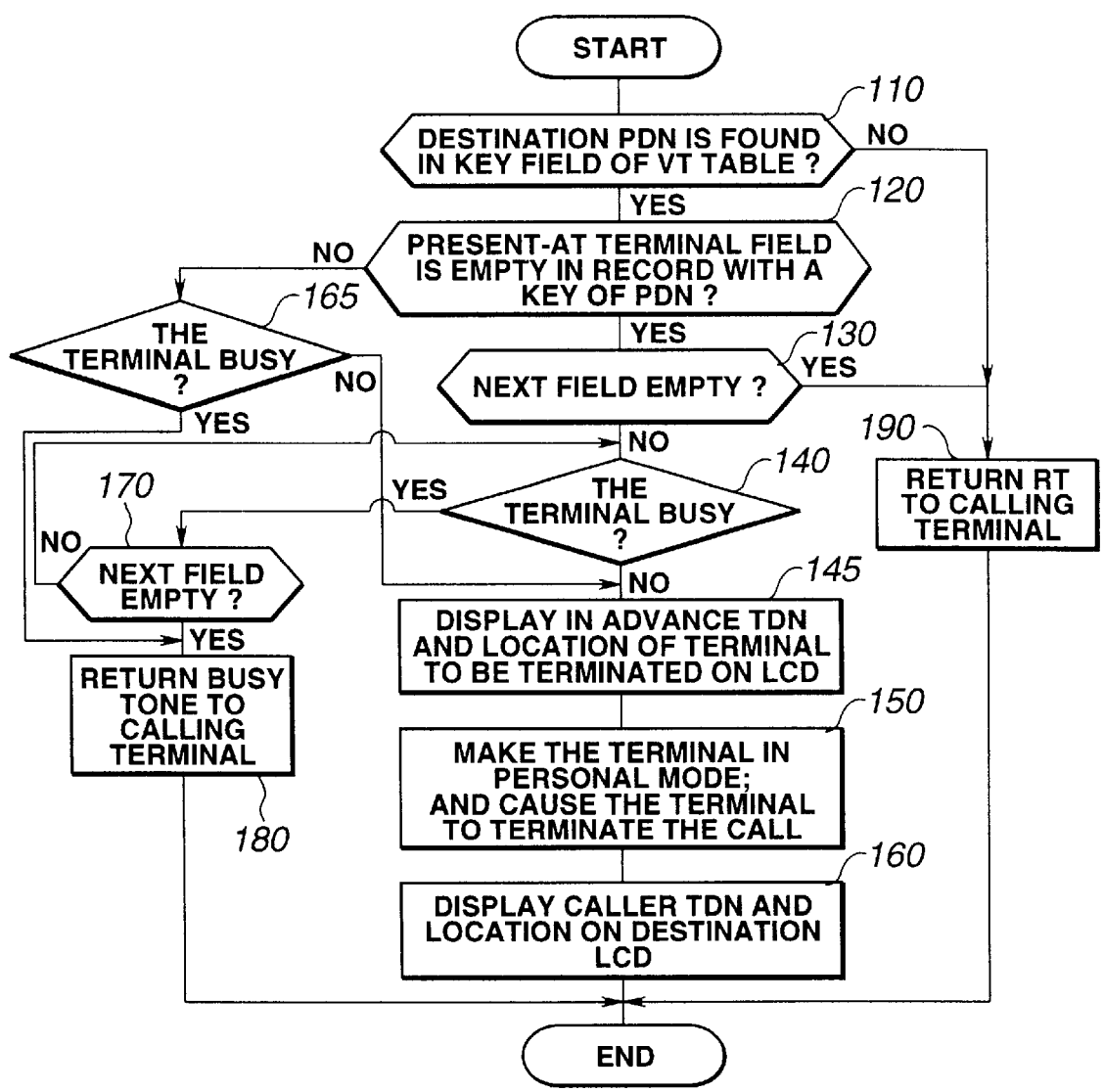
FIG. 17 is a flow chart showing a procedure for establishing a call originated by dialing a PDN.

Calling by dialing a PDN will be described in the following. FIG. 17 is a flow chart showing a control flow of a procedure or program for establishing a call originated by dialing a PDN. On detecting that an extension terminal received a call addressed to a PDN from the terminal connected to the extension the central controller 10 begins with decision step 110 by searching the PDN fields of the VT table of FIG. 7A to see if the PDN is found. If so, the flow proceeds to decision step 120 which determines if the PRSNT AT field of the PDN's record is vacant. If so, the flow proceeds to decision step 130 which determines if the next field or the first one or the ASGMT fields is vacant. If not, the flow proceeds to step 140 which determines if the terminal of the TDN in the next field is busy. If not, the flow proceeds to step 145 which causes the place and the TDN of the terminal to be displayed on the caller LCD 19 before connecting the call lo the terminal. Then the flow proceeds to step 150 which makes the terminal in the personal mode of the PDN and execute a call termination process for connecting the call to the terminal. The flow proceeds to step 160 which cause the TDN and the place of the caller terminal to be displayed on the CLD 19 of the called terminal, and terminates.

If the PDN is not found in decision step 110, then the flow proceeds to step 190 which returns RTs to the calling terminal, and terminates. If the PRSNT AT field of the PDN's record is not vacant in decision step 120, then the flow proceeds to step 165 which determines if the terminal in the PRSNT AT field is busy. If so, the flow proceeds to step 180 which returns busy tones (BTs) to the calling terminal and terminates. Otherwise, the flow proceeds to step 145 and subsequently performs the same call termination operation as described above. If the field next to the PRSNT AT field or the first one of the ASGMT fields is vacant in decision step 130, then the flow proceeds to step 190 which returns RTs to the calling terminal and terminates. If the terminal of the TDN in the next field is busy in decision stop 140, then the flow proceeds to 170 which determines if the next field or the second one of the ASGMT fields is vacant. If not, the flow returns to step 140. And, if so, the flow proceeds to step 180 which returns BTs to the calling terminal, and terminates.

Specifically, if a call is originated by dialing the PRESIDENT'S PDN or 2002 on the above mentioned assumption, the central controller 10 first finds the record with the key data=2002 in the VT table of FIG. 7A. Then, the central controller 10 examines the PRSNT AT field of the record to obtain 4999+N and see if the terminal (4999+N) is busy. If so, the central controller 10 returns BTs to the calling terminal, and terminates. Otherwise, the call is connected to the terminal (4999+N). The displayed contents in this case is shown in FIG. 16C. If the PRSNT AT field is vacant, the central controller, 10 examines the next field or the first one of the ASGMT fields to see if the field is vacant. Since the terminal 5007 is found there, the central controller 10 determines if the terminal 5007 is busy. If not, the call is connected to the terminal 5007. If the terminal 5007 is busy, the central controller 10 further determines if the next terminal 5001 is busy. If not, the call is connected to the terminal 5001. If the terminal 5001 is busy, BTs are returned to the calling terminal because of the vacancy of the next field, and terminates.

According to one aspect of the invention, if a call is originated by dialing a PDN, the caller is informed by display, prior to the call termination (more specifically a few seconds before the start of RBT transmission), of the place of the terminal to which the call is to be connected, so that the caller can advantageously control or change his or her subsequent action in response to the displayed information. If a caller finds from the display of the caller's terminal that the called party is, for example, in the board room 3 and the business of the caller is not urgent, the caller may decide to give up the call so as not to disturb the called party. For the purpose of this feature, a timer step or a user programmable timer step may be inserted between steps 145 and 150.

Also, if a call originated by dialing a PDN is connected to a terminal, the terminal is set for the personal mode of the dialed PDN before the execution of the call termination process as described in step 150. Accordingly, when a called party answers the call, the terminal the called party is about to operate has already been associated with the personalized data for the PDN, thereby advantageously providing the called party with a telephone environment familiar to the called party.

It is noted that when a called party places his or her handset on the hook to terminate a call which was originated by dialing the called party's PDN, the central controller 10 releases the link between the terminal having been used and the personalized data for the PDN just or a predetermined period of time after the detection of the on-hook, thereby restoring the terminal to the standard mode.

Referring now to FIG. 14, operation of entering a personal mode will be described in the following. It is assumed that a user with a PDN=$PDN_p$ change the mode of a terminal which has a TDN=$TDN_t$ and to which the user has already assigned $PDN_p$ to the personal mode for $PDN_p$. As described above, among the data associated with $PDN_p$ there are obtained V(VT, $PDN_p$,) 880 and V(personal data, $PDN_p$,) 890 as personalized feature data, and V(mode, $TDN_t$,) 860, V(terminal, $TDN_t$,) 865 and V(term. attrib., V(terminal, $TDN_t$, T-TYPE),) 847 as personalized terminal data. These data can he directly linked to $TDN_t$. However, the following data which obtained via V(terminal, $TDN_t$, T-TYPE)=$T_i$ can not be used as they are:

Default key data 842, that is, $$V(\text{default key}, T_i) = S_1, S_2, S_3 \ldots S_q, \text{ and} \quad (1)$$

Personalizing key data for which the user has set the terminal of $TDN_t$, that is, $$V(\text{personalized key}, PDN_p, T_i) = A_1, A_2, A_3 \ldots A_q. \quad (2)$$

This is because the personalized key data are such that only the parts of the default key data that the user is not satisfied with has been changed. For this reason, each corresponding pair of the data (1) and (2) is compared with each other in presence to take $A_i$ if $A_i$ exists and to take $S_i$ if only $S_i$ exists but $A_i$ does not exist, thereby yielding personalized key data 870, that is, $$AS_1, AS_2, AS_3 \ldots AS_q.$$

Assuming that $(S_i)=1$ if $S_i$ has a value, $(S_i)=0$ if $S_i$ has no value, $(\underline{S_i})=\text{not }(S_i)$ and these notations are also applicable to $A_i$, the following expression is given:

$$AS_i = (S_i)S_i + (\underline{S_i})(A_i)A_i.$$

This kind of logical calculation can be easily executed by a conventional relational data base system. By linking the data 870 to the terminal of $TDN_t$, the user can use the terminal in the same telephone circumstance as the user's home base telephone provides.

Thus, the invention provides a default key table composed of default data for assigning functions to keys for each of the terminal types served by the system. This facilitates a key customization by a user.

Change of modes will be described in the following. In this section, the standard mode and the native mode are treated likewise. A state in which a terminal is control led on the basis of data in a NATIVE VT field of the mode table of FIG. 6A is considered to be in the standard mode (in case of a vacancy of the NATIVE VT field) or in the native (VT) mode (in case of a presence of any PDN in the NATIVE VT field, which are referred to en bloc as "standard/native mode".

Figure 19:
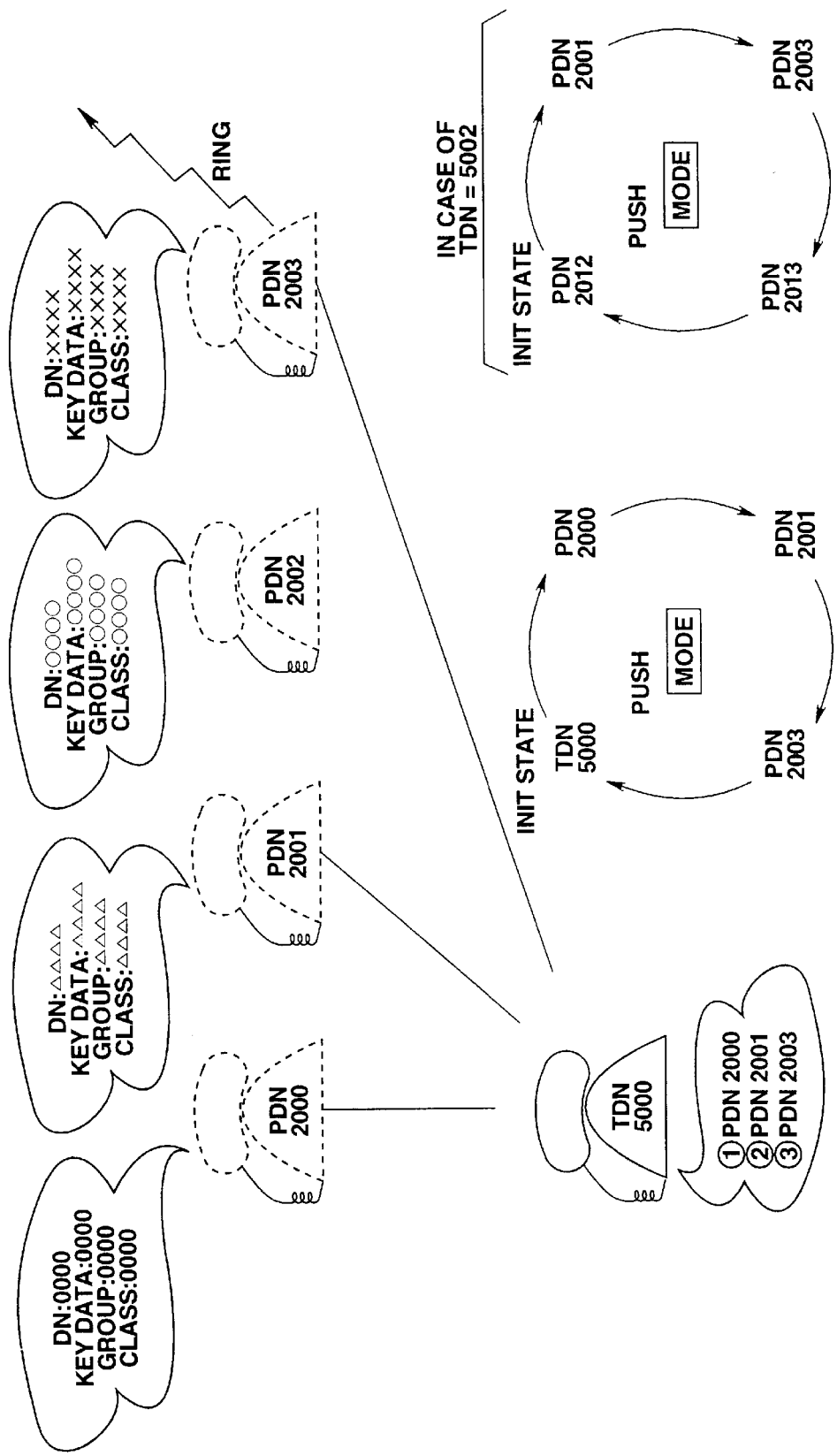
FIG. 19 illustrates origination of a call from a terminal in a personal mode.

FIG. 19 illustrates origination of a call from a certain terminal in a personal mode. In FIG. 19, it is assumed that some PDNs, e.g. 2000, 2001 and 2003, has been assigned to a telephone terminal, e.g. 5000. As described above, a busy terminal in a personal mode will automatically return to the standard or native mode in response to a change or the terminal from the busy state to an idle state. Thus, an idle terminal is considered to be usually in the standard or native mode. A press of the MODE key of the terminal 5000 (or 5002) will cause the mode of the terminal to change to the personal mode 2000 (or 2001) if the terminal is in a initial state (a usual idle state), that is, the standard (or native) mode and to the next mode indicated by the arrow which originates from the current mode in a mode circle if the terminal is in a mode associated with one of the directory numbers which constitute the mode circle.

Figure 18:
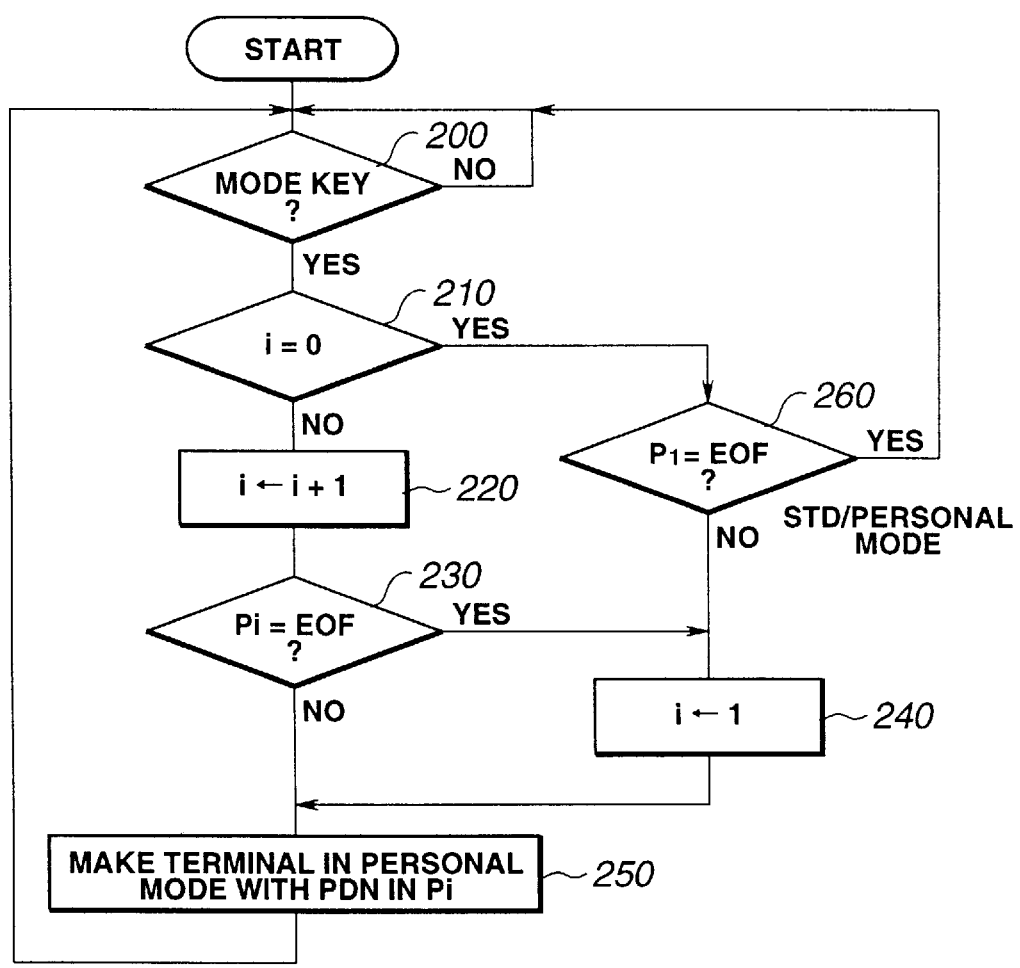
FIG. 18 is a flow chart showing a procedure for changing modes in response to a mode key pressing.

In the mode table of FIG. 6A, just described operation involved in a input of a code for the MODE key is again considered. Each of the PERSONAL MODE, fields are labeled $P_1, P_2, \ldots P_i \ldots$ In a initial state of the terminal, i=0 which means that the mode pointer $P_i$ is at the NATIVE VI field, that is, the terminal is in the standard or native mode. Each time the code for the MODE key is input, "i" is incremented and accordingly the mode pointer $P_i$ moves a field to the right until $P_i$ reaches EOF (end of field), when "i" is set for 1 FIG. 18 is a flow chart showing actions taken by the central controller 10 under the control of a program for changing modes in response to a reception of a code for the MODE key. In response to a reception of a code for the MODE key, the central controller 10 invokes the program which starts from decision step 210 which determines if i=0. if not, the control flow proceeds to 220 which increments "i" and proceeds to decision step 230 which examines the value of the field $P_i$ to see if the value=EOF. If not, the flow proceeds to step 250 which sets the terminal for the mode associated with the value of the $P_i$ field, and then terminates. If the value=EOF in decision step 230, then the flow proceeds to step 200 which sets "i" for 0, and proceeds to step 250, and then terminates. If i=0 in decision step 210, the flow proceeds to step 260 which the field $P_1$ contains EOF. If so, the flow terminates. Otherwise, the flow proceeds to step 240 which sets "i" for 1, and proceeds to step 250 which executes the same operation as described above.

In each time of entering a new mode associated with the PDN contained in the $P_i$ field, the central controller 10 causes the PDN to be displayed on the CLD 19, and at the same time associates the terminal with V(VT, PDN,) 880, V(personal data, PDN) 890, V(mode, TDN,) 860, V(terminal, TDN) 865, V(term. attrib., V(terminal, TDN, T-TYPE),) 847, and the personalized key data 870 as shown in FIG. 14.

Figure 20:
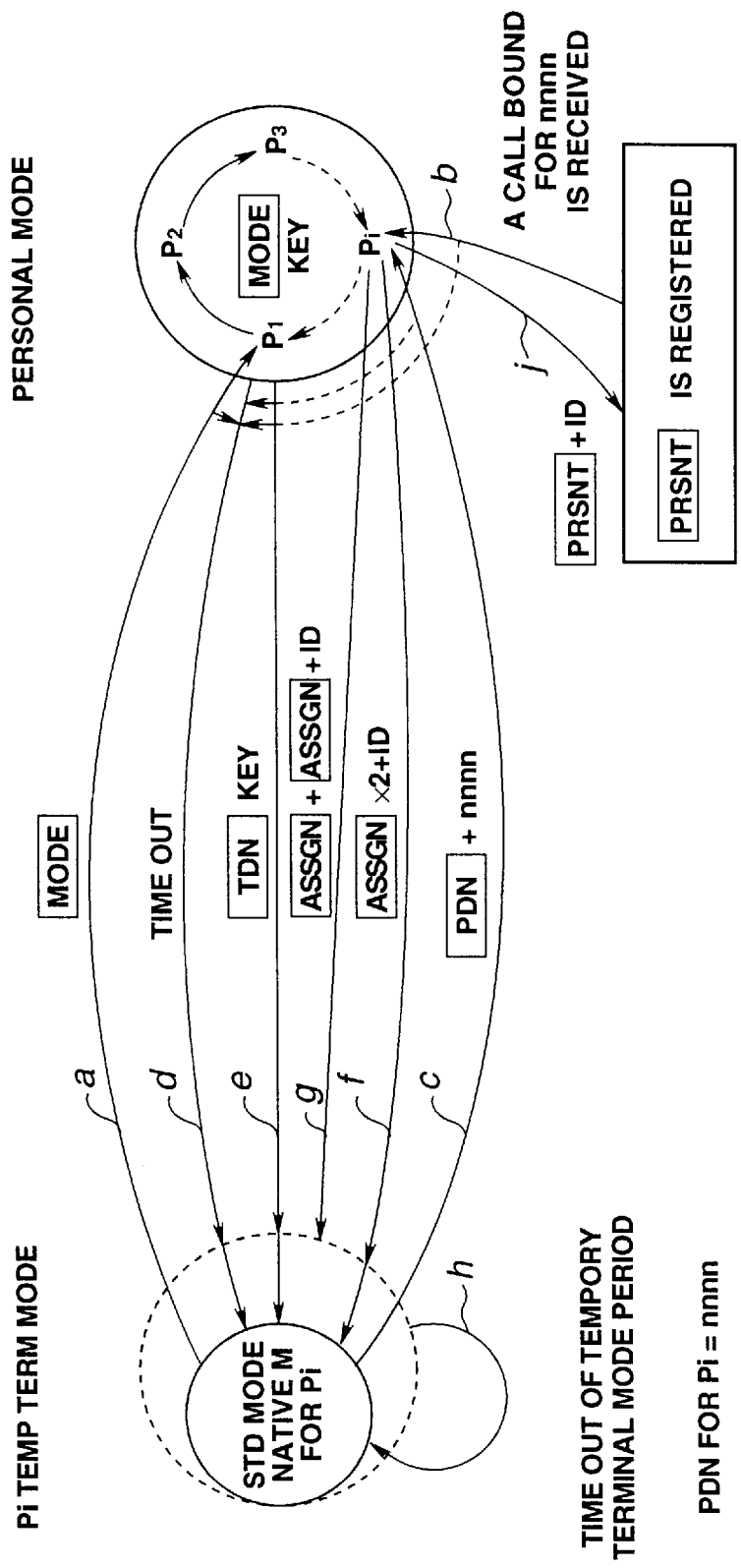
FIG. 20 is a diagram showing state transitions among the modes in the embodiment of the invention.

FIG. 20 is a diagram showing possible state transitions among the modes in the embodiment of the invention. In FIG. 20, the possible transitions are as follows. In the following, the value or PDN contained in the field $P_i$=nnnn.

a. Pressing the MODE key in the standard or native mode of the value in the $P_i$ field causes a change to $P_1$ mode.

b. When a user with a PDN=nnnn at a terminal is about to answer a call addressed to nnnn during the user's presence registration for the terminal, the terminal has already become in the personal mode of nnnn or the $P_i$ mode.

c. Entering a PDN key+nnnn in the standard/native mode causes an immediate change to the $P_i$ mode.

d. An expiration of the time period set in the TIME OUT field of the personal data table of FIG. 7B after a change to a personal mode caused by the above cases a, b and c results in a return to the standard/native mode.

e. Pressing a TDN key in a personal mode results in a return to the standard/native mode.

f. Pressing, for example, two ASGN+ID in a $P_i$ native mode results in a change to a $P_i$ native mode. There is no difference in telephone services between $P_i$ personal and native mode excepting the way of mode change. Once a terminal enters a $P_i$ native mode, the terminal entering a $P_j$ mode for some other user and then exiting from the $P_j$ mode causes the terminal to return to the $P_i$ native mode automatically. Therefore, a terminal is set for a $P_i$ native mode if the terminal is exclusively used by the user of nnnn, or the person uses the terminal much more frequently than other users. The native mode is usually set lastingly.

g. Pressing, for examples, two ASGN+ID in a $P_i$ native mode causes the terminal to stay in the $P_i$ mode for a period of time set in the T EPT-T MODE PERIOD field of the personal data table of FIG. 7B.

h. After the stay in the case "g", the terminal automatically returns to the standard/native mode. This mode is essentially identical to the native mode except that the temporary terminal mode has a temporary mode period set in advance.

j. Pressing PRSNT+ID at a terminal of a TDN results in the user's presence registration for the terminal, that is, storing the TDN in the PRSNT AT field of the record of nnnn in the VT table. As is apparent from the above, it is impossible for a plurality of users to set a single terminal for native modes or temporary modes concurrently, whereas it is possible for any number of users to register their presence for a single terminal.

Figure 21:
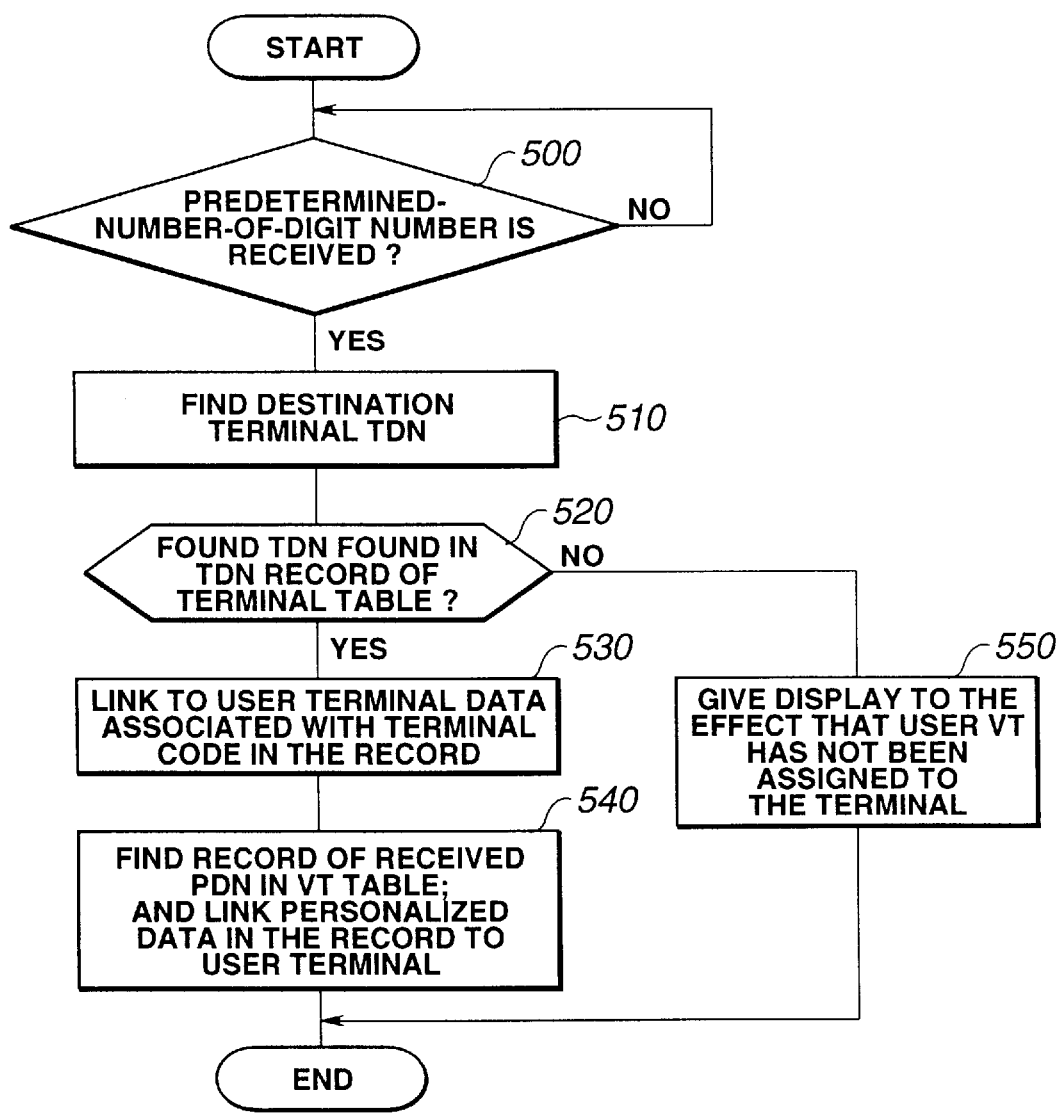
FIG. 21 is a flow chart showing actions taken by the central controller when a PDN key is pressed and subsequently a PDN is entered.

FIG. 21 is a flow chart showing actions taken by the central controller 10 when a PDN key is pressed to enter a PDN. The central controller 10 receives the digits of a PDN input with dials of a telephone via the extension line 3 to which the telephone is connected and the SRD 9 in step 500. If the collection is successful, the flow proceeds to step 510 which find the TDN of the terminal from the key field of the record whose PDN NO. field contains the port number of the terminal in the terminal table of FIG. 6B, and proceeds to decision step 520 which examines the $P_i$ MODE fields of the record whose key field contains the TDN of the terminal in the mode table of FIG. 6A to see if the received PDN is contained in the $P_i$ MODE fields. If so, the flow proceeds to step 530 which links the terminal with PDN related data 880 and 890, proceeds to step 540 which links the terminal with TDN related data 860 and 885, and terminates. If the received PDN is not contained in the $P_i$ MODE fields in decision step 520, then the flow proceeds to stop 550 which causes a message to the effect that the user's TV is not registered for the terminal to be displayed, and terminates.

At the expiration of a predetermined period of time without the terminal being used after a change to a $P_i$ mode (TIME OUT), the central controller 10 makes the terminal in the standard mode. However, originating a call before the return to the standard mode permit the user to originate the call in the $P_i$ mode. A press of the TDN key shown in FIG. 2 causes the terminal to return to the standard mode.

Embodiment II

Figure 22:
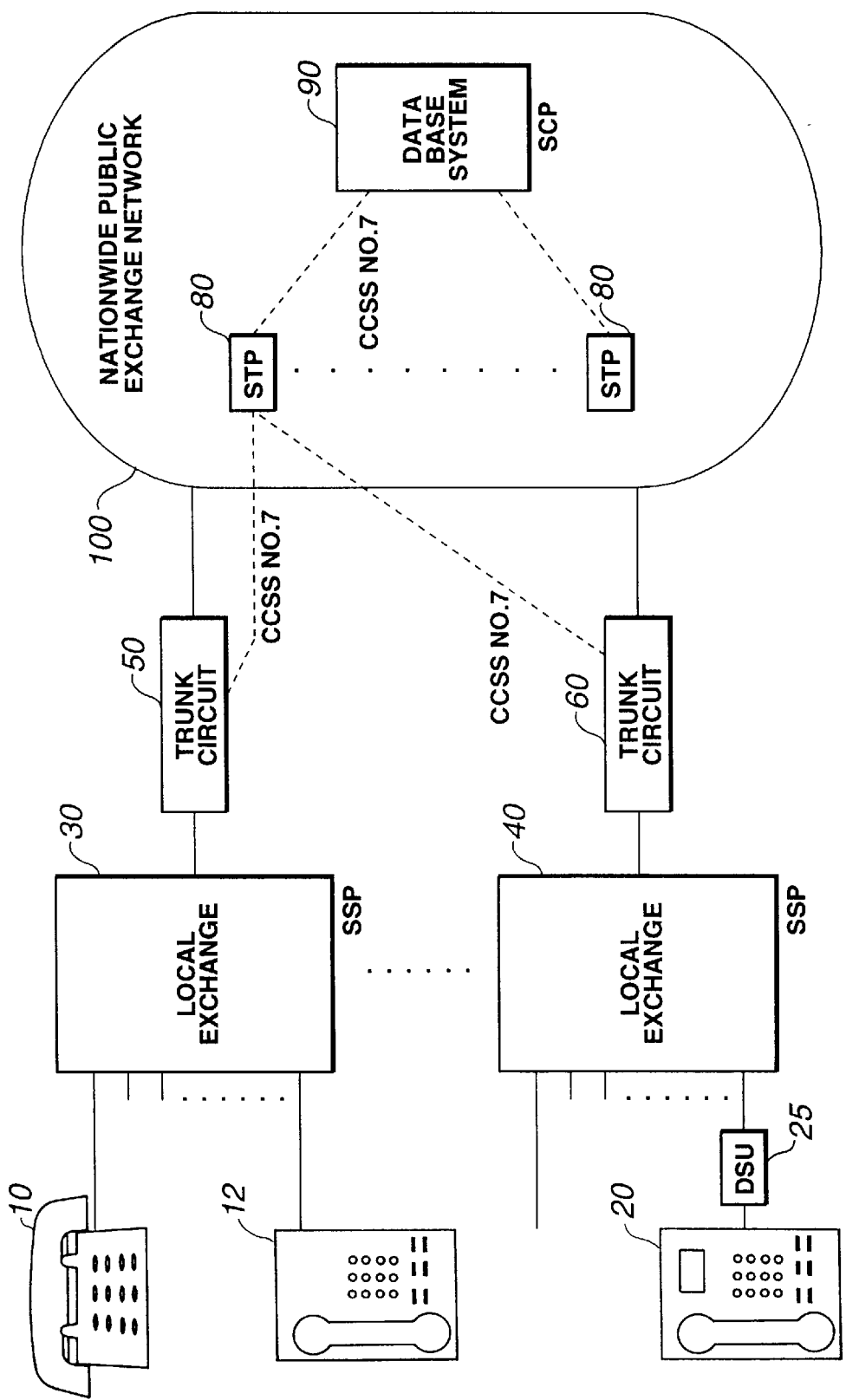
FIG. 22 is a diagram showing a second illustrative embodiment of a system for providing virtual terminal services to the communication terminals included in a nation wide PSTN according to the invention.

FIG. 22 is a diagram showing a second illustrative embodiment of a system for providing virtual terminal services to the communication terminals included in a nation wide PSTN according to the invention. In FIG. 22, the system comprises at least a nation wide PSTN 100, a data base system 90 which is installed in a service control point (SCP) and is accessible from all of the exchanges constituting the PSTN, signal transfer points (STPs) 80 for relaying control signals, analog trunk circuits 50 connected to the PSTN 100, analog exchanges 30 as service switching points (SSPs) which are connected to the PSTN via the analog trunk circuits 50, analog telephone terminals 10 and 12 connected to the analog exchanges 30, digital trunk circuits 60 connected to the PSTN 100, digital exchanges 40 as SSPs which are connected to the PSTN via the digital trunk circuits 60, digital service units (DSUs) 25 connected to the digital exchanges 40, and digital telephone terminals 20 connected to the digital exchanges 40 via DSUs 25. The data base system 90 comprises a data base (not shown in FIG. 22) comprising files or tables as shown in FIG. 14 and a data base management system (not shown) for managing the data base. The broken lines in FIG. 22 indicates common channel signaling system No. 7 (CCSS No. 7 or CCS7).

Operation

In the second embodiment, a telephone directory number is usually expressed as xxx-xxx-xxxx. However, for the purpose of simplicity, a directory number will be, hereinafter, expressed like "5001" by omitting "xxx-xxx-". Also, it is assumed that a user with a PDN=2002 at a terminal, e.g. 10 of a TDN=5001 performs a predetermined operation for making the terminal 10 in the personal mode of 2002. If an exchange, e.g. 30, connected to the terminal 10 receive a command for setting the terminal 10 for the personal mode of 2002, the exchange 30 send a predetermined request to the data base system 90 to cause the data base to be searched and to cause the following data to be retrieved and returned to the exchange 30:

PDN=2002 related data 880 and 890,

TDN=5001 related data 860, 865 and 855, and

Default key data 842 or personalized key data 870. Then, the exchange 30 stores these data in a memory area associated with the TDN=5001. This causes the terminal 10 to become in the personal mode of the PDN=2002.

Once an exchange 30 have set a terminal 10 for a virtual terminal of a certain PDN as described above, the exchange 30 thereafter operates in the same way as described in the first It is noted that the contents or the SERVICE FLAG field of the personal data table of FIG. 7B according to the second illustrative embodiment is quite different from that in case of a PBX system like the first embodiment. FIG. 23 is a table showing exemplary service flags in the personal data table in this embodiment. As seen from FIG. 23, the flags comprise such services as are provided by a conventional PSTN excepting "TEMPORARY TERMINAL MODE".

Returning to FIG. 7B, there is a SUBSCRIBER PDN field in the personal data table 830. Though this field was not necessary in the first embodiment, it is vary important in a PSTN based system such as the second embodiment. In a PBX system, which is managed within an enterprise, there is no need to take charging or billing into account. However, in an PSTN, considering, e.g. an ordinary family, there is only one subscribers whereas there are more users. Therefore, it is necessary in this embodiment to draw a sharp line between subscribers and users as far as charging or billing is concerned. For the purpose of this, a person who subscribes for a telephone communication and pays own telephone fee is called a "subscriber", and a person who uses its telephone communication approved by a subscriber is called a "user" in the second embodiment.

In FIG. 7B, if a person of $PDN_i$ is a subscriber, a specific code common for all the subscribers or the $PDN_i$ is stored in the SUBSCRIBER PDN field of the $PDN_i$ record. If a person of $PDN_i$ is a user, the $PDN_j$ of a subscriber who is to pay the telephone fee of the user of $PDN_i$ is stored in the SUBSCRIBER PDN field of the $PDN_i$ record. By doing this, billing information on a person of $PDN_i$ is advantageously associated with a subscriber responsible for the payment of the person's telephone fee by means of the SUBSCRIBER PDN field.

It is noted that all of the data are controlled by a data base system accessible from all the exchanges in the above description, but the VT table 820, the personal data table 830 and the personalized key table 850 may be stored in a portable storage media and the other data may be stored in the data base system. This scheme is preferable not only because the load of the data base system can be lightened but also because telephone terminals themselves often have speed calling related functions.

Many widely different embodiments of the present invention may be constructed without departing from the spirit and scope of the present invention. It should be understood that the present invention is not limited to the specific embodiments described in the specification, except as defined in the appended claims.

What is claimed is:

1. A telephone system comprising:

a plurality of telephone terminals;

a first data table for storing data that assigns services of ones of said telephone terminals each corresponding to a personal directory number of each subscriber;

a second data table for storing a telephone terminal number corresponding to each personal directory number;

terminating terminal detecting means for detecting a terminating telephone terminal when a call is originated with a personal directory number of a called terminating subscriber, by searching for a terminal number from the second data table in response to the personal directory number of the terminating subscriber;

calling means for calling the terminating telephone terminal corresponding to the terminal number detected by the terminating terminal detecting means; and service assigning means for assigning services, based on the first data table, to the terminating telephone terminal corresponding to the personal directory number of the terminating subscriber.

2. A telephone system comprising:

a plurality of telephone terminals having function keys and assignable keys;

a first data table for storing data that assigns functions of ones of said telephone terminals each corresponding to a personal directory number of each subscriber;

a second data table for storing a telephone terminal number corresponding to each personal directory number;

terminating terminal detecting means for detecting a terminating telephone terminal when a call is originated with a personal directory number of a called terminating subscriber, by searching for a terminal number from the second data table in response to the personal directory number of the terminating subscriber;

calling means for calling the terminating telephone terminal corresponding to the terminal number detected by the terminating terminal detecting means; and key function assigning means for assigning functions, based on the first data table, to the assignable keys and the function keys of the terminating telephone terminal corresponding to the personal directory number of the terminating subscriber.

3. A telephone system comprising:

a plurality of telephone terminals;

a first data table for storing data that assigns speed calling features of ones of said telephone terminals each corresponding to a personal directory number of each subscriber;

a second data table for storing a telephone terminal number corresponding to each personal directory number;

terminating terminal detecting means for detecting a terminating telephone terminal when a call is originated with a personal directory number of a called terminating subscriber, by searching for a terminal number from the second data table in response to the personal directory number of the terminating subscriber;

calling means for calling the terminating telephone terminal corresponding to the terminal number detected by the terminating terminal detecting means; and memory data changing means for changing data utilized for speed calling, based on the first data table, corresponding to the terminating telephone terminal corresponding to the personal directory number of the terminating subscriber.

4. A telephone system comprising:

a plurality of telephone terminals;

a first data table for storing data that assigns features of ones of said telephone terminals each corresponding to a personal directory number of each subscriber;

a second data table for storing a telephone terminal number corresponding to each personal directory number;

terminating terminal detecting means for detecting a terminating telephone terminal when a call is originated with a personal directory number of a called terminating subscriber, by searching for a terminal number from the second data table in response to the personal directory number of the terminating subscriber;

calling means for calling the terminating telephone terminal corresponding to the terminal number detected by the terminating terminal detecting means; and feature assigning means for assigning features, based on the first data table, to the terminating telephone terminal corresponding to the personal directory number of the terminating subscriber.

5. The telephone system according claims 1, 2, 3, or 4, further comprising:

terminated call detecting means for detecting that a call has been terminated at the terminating telephone terminal;

timer means for detecting passage of a predetermined time after detecting the terminated call;

returning means for returning the features of the terminating telephone terminal to the original features when the timer means detects that the predetermined time has lapsed.

6. The telephone system according to claim of 4, wherein the feature assigning means assigns the features in response to the calling by the calling means.

7. The telephone system according to claim of 4, wherein the feature assigning means assigns the features before a response operation is made by the terminating subscriber.

8. A telephone system comprising:

a plurality of telephone terminals;

a first data table for storing data that assigns features of ones of said telephone terminals each corresponding to a personal directory number of each subscriber;

a second data table for storing a telephone terminal number corresponding to each personal directory number;

a standard terminal data table for storing data that assigns features of a telephone terminal to a standard telephone terminal;

terminating terminal detecting means for detecting a terminating telephone terminal when a call is originated with a personal directory number of a called terminating subscriber, by searching for a terminal number from the second data table in response to the personal directory number of the terminating subscriber;

calling means for calling the terminating telephone terminal corresponding to the terminal number detected by the terminating terminal detecting means;

feature assigning means for assigning features, based on the first data table, to the terminating telephone terminal corresponding to the personal directory number of the terminating subscriber;

terminated call detecting means for detecting that a call has been terminated at the terminating telephone terminal;

timer means for detecting passage of a predetermined time after detecting the terminated call;

canceling means for canceling the features of the terminating telephone terminal when the timer means detects that the predetermined time has lapsed;

return means for returning the features of the terminating telephone terminal to the features of the standard telephone terminal based on the standard terminal data table when the canceling means cancels the features.

9. The telephone system according to claim 8, further comprising:

a third data table for storing the data where each telephone terminal is located;

table searching means for searching the third data table and detecting the location of the terminating telephone terminal;

display controlling means for controlling the display screen of the originating telephone terminal and displaying the location of the terminating telephone terminal before the calling means calls the terminating telephone terminal.

10. The telephone system according to claim 8, further comprising:

a third data table for storing the data where each telephone terminal is located;

table searching means for searching the third data table and detecting the location of the terminating telephone terminal;

display controlling means for controlling the display screen of an originating telephone terminal and displaying the location of the terminating telephone terminal during the predetermined time;

cancel input detecting means for detecting whether a cancel operation is generated at the originating telephone terminal within the predetermined time;

call stopping means for stopping the calling of the terminating telephone terminal if the cancel input detecting means detects the cancel operation.

11. A telephone system comprising:

a plurality of telephone terminals having a mode key and a display screen;

a first data table for storing data that assigns features of ones of said telephone terminals each corresponding to a personal directory number of each subscriber;

a second data table for storing a plurality of personal directory numbers corresponding to each terminal number and include a pointer for pointing at a personal directory number;

candidate personal directory number detecting means for increasing the pointer by one, in response to operation of the mode key, and detecting personal directory number pointed by the pointer;

feature assigning means for assigning features of a selected one of the telephone terminals, of which the mode key is operated, corresponding to the data in the first data table corresponding to the detected personal directory number; and display controlling means for controlling the display screen of the selected telephone terminal and displaying the personal directory number detected by the candidate personal directory number detecting means.

12. The telephone system according to claim 11, further comprising:

a standard terminal data table for storing data that assigns features of the selected telephone terminal to the standard telephone terminal; and turning means for turning the features of the selected telephone terminal into the feature of the standard telephone terminal based on the standard terminal data table when the pointer has pointed to all personal directory numbers in the second data table.

13. A method for assigning services of a telephone terminal in a telephone system, the system including a first data table for storing data that assigns telephone terminal services corresponding to a personal directory number of each subscriber and a second data table for storing a telephone terminal number corresponding to each personal directory number, the method comprising the steps of:

detecting a terminating telephone terminal when a call is originated with a personal directory number of a called terminating subscriber, by searching for a terminal number from the second data table in response to the personal directory number of the terminating subscriber;

calling the terminating telephone terminal corresponding to the detected terminal number; and assigning services, based on the first data table, to the terminating telephone terminal corresponding to the personal directory number of the terminating subscriber.

14. A method for assigning functions of a telephone terminal in a telephone system, the telephone terminal having function keys and assignable keys, and the telephone system including a first data table for storing data that assigns telephone terminal functions corresponding to a personal directory number of each subscriber and a second data table for storing a telephone terminal number corresponding to each personal directory number, the method comprising the steps of:

detecting a terminating telephone terminal when a call is originated with a personal directory number of a called terminating subscriber, by searching for a terminal number from the second data table corresponding to the personal directory number of the terminating subscriber;

calling the terminating telephone terminal corresponding to the detected terminal number; and assigning functions, based on the first data table, to the assignable keys and the function keys of the terminating telephone terminal corresponding to the personal directory number of the terminating subscriber.

15. A method for assigning speed calling features of a telephone terminal in a telephone system, the system including a first data table for storing data that assigns telephone terminal speed calling features corresponding to a personal directory number of each subscriber and a second data table for storing a telephone terminal number corresponding to each personal directory number, the method comprising the steps of:

detecting a terminating telephone terminal when a call is originated with a personal directory number of a called terminating subscriber, by searching for a terminal number from the second data table corresponding to the personal directory number of the terminating subscriber;

calling the terminating telephone terminal corresponding to the detected terminal number; and changing data utilized for speed calling, based on the first data table, corresponding to the terminating telephone terminal corresponding to the personal directory number of the terminating subscriber.

16. A method for assigning features of a telephone terminal in a telephone system, the system including a first data table for storing data that assigns telephone terminal features each corresponding to a personal directory number of each subscriber and a second data table for storing a telephone terminal number corresponding to each personal directory number, the method comprising the steps of:

detecting a terminating telephone terminal to be called, when a call is originated with a personal directory number of a called terminating subscriber, by searching for a terminal number from the second data table corresponding to the personal directory number of the terminating subscriber;

calling the terminating telephone terminal corresponding to the detected terminal number; and assigning the features, based on the first data table, to the terminating telephone terminal corresponding to the personal directory number of the terminating subscriber.

17. A method for assigning features of a telephone terminal according to claims 13, 14, 15, or 16, further comprising the steps of:

detecting that a call has been terminated call at the terminating telephone terminal;

detecting passage of a predetermined time after detecting the terminated call; and returning the features of the terminating telephone terminal to the original features when the predetermined time has lapsed.

18. A method for assigning features of a telephone terminal, comprising the step of:

detecting a terminating telephone terminal when a call is originated with a personal directory number of a called terminating subscriber, by searching for a terminal number corresponding to the personal directory number of the terminating subscriber;

calling the terminating telephone terminal corresponding to the detected terminal number;

assigning features to the terminating telephone terminal corresponding to the personal directory number of the terminating subscriber;

detecting that a call has been terminated at the terminating telephone terminal;

detecting passage of a predetermined time after detecting the terminated call;

canceling the features of the terminating telephone terminal, corresponding to the personal directory number of the terminating subscriber, when the predetermined time has lapsed;

returning the features of the terminating telephone terminal to the features of a standard telephone terminal after the terminating subscriber features have been cancelled.

19. A method for assigning features of a telephone terminal according to claim 18, further comprising steps of:

searching the location of the terminating telephone terminal;

controlling a display screen of an originating telephone terminal and displaying the location of the terminating telephone terminal before a call is connected to the terminating telephone terminal.

20. A method for assigning features of a telephone terminal according to claim of 18, further comprising the steps of:

searching the location of the terminating telephone terminal;

controlling a display screen of an originating telephone terminal and displaying the location of the terminating telephone terminal before a call is connected to the terminating telephone terminal during the predetermined time;

detecting whether a cancel operation is generated at the originating telephone terminal within the predetermined time; and stopping the calling of the terminating telephone terminal when the cancel operation is detected.

21. A method for assigning features of a telephone terminal in a telephone system, the telephone terminal having a mode key and a display screen, the system including a data table for storing data that assigns telephone terminal features each corresponding to a personal directory number, the method comprising the steps of:

changing a personal directory number corresponding to a terminal whenever a mode key is operated;

assigning, based on the data table, features corresponding to the changed personal directory number to the telephone terminal; and displaying the changed personal directory number at the display screen of the telephone terminal.

* * * * *